US006758397B2

(12) United States Patent
Catan

(10) Patent No.: US 6,758,397 B2
(45) Date of Patent: Jul. 6, 2004

(54) MACHINE READABLE LABEL READER SYSTEM FOR ARTICLES WITH CHANGEABLE STATUS

(75) Inventor: Carolyn Ramsey Catan, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 122 days.

(21) Appl. No.: 09/823,874

(22) Filed: Mar. 31, 2001

(65) Prior Publication Data

US 2002/0139848 A1 Oct. 3, 2002

(51) Int. Cl.[7] .................................... G06F 17/60
(52) U.S. Cl. ........................................ 235/385; 235/375
(58) Field of Search ................................ 235/385, 375

(56) References Cited

U.S. PATENT DOCUMENTS

| | | | | | |
|---|---|---|---|---|---|
| 5,001,331 | A | * | 3/1991 | Leestemaker | 235/375 |
| 5,063,507 | A | * | 11/1991 | Lindsey et al. | 705/26 |
| 5,478,990 | A | * | 12/1995 | Montanari et al. | 235/375 |
| 5,541,394 | A | * | 7/1996 | Kouchi et al. | 235/375 |
| 5,821,512 | A | * | 10/1998 | O'Hagan et al. | 235/383 |
| 5,920,287 | A | * | 7/1999 | Belcher et al. | 342/450 |
| 5,959,531 | A | * | 9/1999 | Gallagher, III et al. | 340/531 |
| 6,123,259 | A | * | 9/2000 | Ogasawara | 235/380 |

FOREIGN PATENT DOCUMENTS

| | | | |
|---|---|---|---|
| DE | 4321754 A1 | 2/1995 | G06F/17/60 |
| WO | WO0045331 | 8/2000 | G06K/19/07 |

OTHER PUBLICATIONS

Http://www.media.mit.edu/ci/resources/press/BG99.html, Jun., 1999.

Http://digital–bauhaus.com/html/paper1.html, Aug., 1999.

Http://www.media.mit.edu/ci/projects/bending.mashin.paper.html, month and year missing.

Http://www.pressi.com/pressi–html/14975.html, Jun., 2002.

Http://www.connectthings.com/press/press000615.html, Jun., 2000.

* cited by examiner

*Primary Examiner*—Michael G. Lee
*Assistant Examiner*—Kimberly D. Nguyen

(57) ABSTRACT

A method and system for tracking a changeable description of an article labeled by a machine-readable label (MRL) allows articles like fresh vegetables to be labeled with MRL devices. A unique code in the MRL is correlated with descriptive information about the article including, possibly, changeable information such as a remaining quantity of the article. The descriptive information can be updated, so for example, if the information relates to a bottle of vinegar, the quantity remaining is always correlated to the MRL if the information is regularly updated. Thus, for example, a household inventory can be maintained with quantities that are below an initial value of a purchased item. Also, fresh foods like vegetables and deli foods can be automatically tracked by a home inventory system that reads MRL devices such as radio frequency identification tags.

11 Claims, 22 Drawing Sheets

MACHINE READABLE LABEL READER SYSTEM FOR ARTICLES WITH CHANGEABLE STATUS

BACKGROUND OF THE INVENTION

1. Field of the Invention

The invention relates to systems that employ machine-readable labels to store data and deliver them to readers when scanned. Examples include one- and two-dimensional bar-codes, memory buttons, smart cards, radio-frequency identifier (RFID) tags, smart cards, magnetic stripes, micro-chip transponders, etc.

2. Background

Various devices for encoding data currently exist and are under development. These take many different forms, from optical devices such as two-dimensional bar-codes to radio devices such as transponders. These devices generally permit objects to be tagged or labeled to permit machines to read data associated with the object. One-dimensional bar-codes have been used widely for this purpose, but they are limited in terms of how much information they can store. For example, they can identify classes of objects, but not individual objects.

A recent entrant to this field, radio-frequency identifier (RFID) tags, delivers information by radio signals to a reader just as a transponder does. One of the attractions of RFID devices is their potential to carry a large quantity of information. This is in contrast to conventional bar codes whose data capacity is much more limited. Another alternative to conventional bar-codes are two-dimensional bar codes. These are two-dimensional symbols that are capable of encoding much more data than a conventional bar-code. Another encoding device is the iButton®, a small token that stores information that can be read by a reader that makes electrical contact with the iButton®. Still other devices for storing information include printed and non-printed (e.g., etched) machine readable symbols (e.g., using a pattern recognition process) and digital watermarks.

Commercial applications of RFID technology are expected to be highly successful. Supply chain management is one of the biggest. Plans are for manufacturers to register each product's serial number in a database that could be accessed during the product's journey through the supply chain. By keeping the data on a network resource such as a server, a service provider could enable stores or warehouses to use a portable scanner to check the history of the product. Retailers thus could check for authenticity or theft, as well as monitor out-of-stock and out-of-demand trends. RFID tags may be programmable and may also include sensors that can record, right in the tag, various environmental factors such as the amount of time a crate of fruit was held at a given temperature.

An obvious model for a future consumer market for RFID tags is the present consumer market for bar-code readers. While bar-code readers have been widely adopted by commercial and industrial users, so far, attempts by manufacturers and vendors to develop consumer markets have met with very limited success. Some examples of consumer applications, current and future, are discussed below.

One example of a bar-code reader product aimed at consumers is the Cue Cat®, a reader designed to be installed on a computer and used to read bar-codes printed in catalogues, magazine advertisements, and product labels. When a user scans a bar-code, the code is automatically conveyed through the Internet to a server that points the user's browser to a web site for that particular bar-code. The user is saved the trouble of typing in a web address, which could conceivably be a long one if every product had its own web address, but the benefit is not much greater than that. Also, web addresses can be generated for existing products (like a year-old can of peaches in the cupboard) without the user having to look one up (such as by searching with a search engine). If the maintainer of the Cue Cat® service fails to provide a link for a product, users can suggest a web address. Another similar proposed application is bar-codes on coupons that take the user to a 'bonus coupon' section on a web site.

Another proposed application is recipe books with bar-codes that a user can scan and automatically generate a shopping list for the grocery store. The user chooses what to purchase by scanning bar-codes on labels of products at home. From this, a service generates a shopping list to take to the store and use as a dietary guide. Using a cordless barcode scanner the user scans barcodes on boxes or wrappers of grocery items to add them to the user's shopping list. The scanner is synched to a computer before shopping, and by means of an Internet connection, the personalized shopping list is generated and printed out. The shopping list includes healthy suggestions for the items on the list that are identified as similar to what was originally scanned, but more consistent with the user's specified dietary goals. Categories such as less fat, less sodium, fewer calories or other options are provided for. The list is broken down into two columns, one containing suggested choices and one with the items originally scanned. An explanation of why this food item is better is provided for each item. An indication is also provided for how close the original item is to the system's best choice for the class of product. A recipe icon next to some items cues the user to click on links for recipes that use the items on the shopping list and conform to the nutritional profile. For grocers that subscribe to a service, coupon offers can be entered on the shopping list and even downloaded to the user's shopper's loyalty card file.

Portable readers are used, or proposed to be used, in various other applications. For example, a consumer can maintain an inventory of bar-coded valuables, such as bicycles, camcorders, cars, etc. Another application allows users to scan items at participating retailers and build a "wish list" that they can post to a personalized web page. The list can be organized and emailed to others for gift-related occasions. Shoppers register at a mall kiosk, set up a password, and check out a scanner. Shoppers then build their "wish list" by simply scanning bar codes of items. The data is then downloaded to the kiosk when the scanner is returned and the wish list is posted to the web site. Yet another application, which is very similar to the Cue Cat® is the idea of placing a bar-code on a movie or sporting event ticket stub. The bar-code, in Cue Cat®-fashion, brings the user to a web-site automatically, allowing the user to purchase products relating to the event, such as sports memorabilia or movie sound-tracks. Yet another, offered by AirClic®, uses bar-codes attached to print articles to bring the user to a web site giving access to updated information, purchase opportunities, or other web features relating to the article. The technology is envisioned as being incorporated in handy appliances such as a cell phone, so the user does not need to be near a computer to use it.

The above examples illustrate various attempts to find consumer applications for their products. Most of these are one-off (specialized) ideas and confer little benefit over traditional ways of accomplishing their respective tasks. The wish list application is highly specialized, as are the grocery shopping list application and the home inventory application. With bar-codes being as pervasive as they are, it is surprising that nobody has come up with truly useful ways of using them, at least for consumers. As discussed above, one component of a break-through may be to increase the amount of data that can be stored on bar-code or other types of data storage vehicle. While this, by itself, will not make "killer applications" roll off the tops of designers' heads, many benefits arise in connection with the increased data capacity of RFID tags and other technologies for storing larger quantities of data than traditional bar-codes.

Unlike bar-codes, which can encode only enough data to correlate a small amount of information, some machine-readable label (MRL) devices can store enough information to accomplish some very interesting things. For example, if attached to a product, it can uniquely identify that particular product, which could be tied in a central database to its date of manufacture, the shipment vessel it was conveyed in, its date of shipment, the retailer to whom it was shipped, to whom it was sold, how it was manufactured, when, etc. Also, some MRL devices can also be programmed to change the data stored in them, as, for example, does the temperature sensing supply chain application mentioned above. Another advantage is that some are capable of being scanned by holding a reader some distance away and without precisely aiming the reader with respect to the MRL device. Some readers are capable or reading many MRL devices at once, for example RIFD readers.

Generally, MRL devices have been rather expensive, so few applications have been developed for the consumer market. An example of a system aimed at consumers, which is not greatly affected by cost, is a supermarket system for promoting products. In this system, a user picks up a shopping cart equipped with a portable radio terminal. As the user browses the aisles, he/she passes certain radio transmitting stations that have been set up to promote products shelved near those stations. As the user nears each such station, the portable radio terminal receives a message from the station and begins to play a promotional graphic and/or text message with attending sound. The graphic and text/audio messages are derived from some other source, such as a network server to which the terminal is wirelessly connected. The station transmits a unique identifier that prompts the terminal to deliver the graphic and text/audio message corresponding to the identifier. Similar applications are expected to appear in a greater range of contexts as the costs of high density MRL devices come down.

Research projects, such as at Massachusetts Institute of Technology (MIT) Media Lab, have explored using RFID tags to automate many activities. For example, one project resulted in the construction of a coffee machine that could read the identity of the owner of a coffee mug placed for receiving coffee. Using this information, the machine made the particular type of coffee favored by the mug's owner and played music preferred by him/her. Another application proposed by the Media Lab is a refrigerator which reads the RFID tags of its contents, thereby maintaining an inventory. Another example was a microwave oven that gave instructions to the user and programmed itself for the type of food (given by an RFID tag) that was to be cooked. These systems are envisioned as being part of a household network with all manner of input and output devices, all of them intelligent and environment-responsive. The refrigerator knows what the oven is doing. Ovens, sinks, etc., all know their contents, status, and are enabled to act on objects both physically and digitally. The cupboards can advise a user as to whether s/he has all the ingredients you need to make a recipe. The kitchen observes the user making the recipe and gives advice synchronized with the user's activity.

A white paper written by Joseph Kaye of MIT Media Lab proffered a number of concepts relevant to the environment of the current invention. One concept is for everything to be connected. For example, the RFID tag on a Tupperware container informs a reader in the sink that the container is being washed and is therefore empty. The food that had been stored in the container was removed and the container emptied. A particular food had previously been associated with the container's RFID tag by the refrigerator which "asked," when the container was put into the refrigerator, for information on the container's contents. The contents were thereafter part of the food inventory until the container was emptied. A smart kitchen envisioned by MIT Media Lab helps a user cook by guiding the user through a recipe, recommending substitutions, and telling the user where to find ingredients. Mr. Kaye also suggests identifying all products uniquely and providing each with an individual web page, available from which is every detail of that particular product's history.

There is a need in the current state of the art for applications of code-reading devices which provide real benefits that consumers will want and to provide these benefits with a minimum of hassle so consumers will adopt the applications.

SUMMARY OF THE INVENTION

The invention is designed for an environment in which inexpensive machine-readable label devices ("MRL devices") appear in a great variety of contexts, as do bar-codes presently. In the future, high data-density MRL devices may appear on purchasable products, ticket stubs, advertising media, shipping containers, delicatessen containers, etc. Readers of MRL devices may also proliferate. For example, they may be found in portable devices such as personal information managers (PIMs), cell phones, or cross-over devices. They may also be found incorporated in many common fixed appliances such as cash registers, publicly-accessible kiosks, domestic appliances, TV remote controls, etc.

Although a world full of high data-density MRL devices and readers is forecast by many technology-watchers, this will only happen if such devices provide real value to users. The present invention is concerned with several barriers to reaching this goal. One barrier is the demands any new technology makes on users. Users do not like to adopt new ways of doing things, unless there is a big payoff. Making technology that is easy to use as well as useful often means complex programming. Another barrier to widespread consumer acceptance is the difficulty of providing information and/or services that are truly useful to the user in a wide array of different contexts rather than simply a small number of narrow contexts.

One way to make MRL applications easy to use is to insure that they only present to the user those pieces of information and services that are relevant to the user. That way, the user is not required to navigate menus or enter additional information to get to something useful. To do this, preferably, the user's immediate circumstances and preferences need to be taken into account. Most wireless applications are built with very little capacity for personalization, although this is an important design element for web portals that users return to again and again. The goal of the present invention is to provide a system that users will turn to repeatedly in many contexts, including new ones, because they have the experience that the system usually provides valuable information and/or services with a minimum of hassle. At the back end, another goal of the system is to provide this utility with a minimum of difficulty for programmers to provide the services.

The invention provides mechanisms by which a MRL reader may deliver highly relevant information or processes relating, in some way, to an article to which a MRL device is attached, taking into account other circumstances relating to the user such as the user's personal preferences, the user's environment, etc. The invention also provides mechanisms for sifting through the large quantity of potentially relevant information or number of resources and identifying those that are most likely to be the best choices for the user, thereby avoiding making demands on the user. Further, the invention provides mechanisms for insuring that the reader never produces useless responses even when confronted with requests that are impossible to predict, such as a user scanning a cereal box with a table-saw reader. Still further, the invention provides mechanisms by which a portable reader can still provide utility even when not connected to a database that can decode the MRL data.

Making intelligent use of many available sources of information about the user and his/her status and context of use at the time a request is made (compactly, the "user state") is an onerous programming task because of the many possible system responses. In addition, even without the issue of how to connect the many possible user states to many possible responses, it can be difficult on its own to provide the large numbers of responses that are connectable with the possible user states.

To this end, the invention leverages advances in search engine technology. New search engine technologies allow users to specify requests in natural language in order to access large unorganized corpuses of data (web pages). These technologies have the potential for being adapted to use in MRL systems. This makes it possible to create response data in a relatively unstructured format, relying on sophisticated search engine technology to determine how to connect requests to the most appropriate information or services in a resource database.

With a robust and flexible strategy in place for leveraging all available user state information, it is easier for new functionality to be added. For one thing, a service provider who creates a resource database does not need to script a response for each anticipated situation. This makes the task of adding new responses to a response database less onerous. For another thing, a single situation may admit of a variety of different responses. The usual way of handling that is to give the user a choice. By using the robust strategy suggested here, the system can filter the multiple of potentially applicable responses, avoiding the need for the user to make the choice in subsequent steps. The user receives the desired response faster and with less hassle. Readers affixed to a particular object, such as a home appliance, may transmit information identifying the particular object to the information resource. For example, the microwave oven may identify its make and model number to the information resource before receiving programming instructions. By providing the information resource with specific details about the context of the request for information (e.g., "I am a microwave oven, located in a residence, and I am requesting information about this particular frozen dinner."), the information resource can make its response as relevant as possible ("You must want programming instructions.") Without the particulars of the context, it might take several exchanges between a user and the information resource before the relevant information was delivered. For example, the user could be shopping and simply want to know something about the product in anticipation of purchasing it. Without the context, the situation is much like visiting a worldwide web (WWW) site today, where it is necessary to navigate a menu tree before the desired information can be found.

Given that additional information supplied to the information resource can increase the relevance of responses, readers may be programmed to deliver information regarding the requesting user. For example, a personal reader may store a user profile or access a user profile stored on a network (or Internet). The benefit of the latter is that it further allows the responding information provider to personalize its response, increasing the odds the user will act on the information supplied. This personalization data can be transmitted from the reader or derived by the information provider from another server storing such data according to a unique identifier for the personalization data.

Other sources of information that may be used to increase the relevancy of responses include stored historical use patterns/preferences, general data such as news, weather, time of day, season of the year, and information from other resources such as an inventory stored on a local network server. Here is an example of how such data could be used. An individual scans a MRL device affixed to a frozen dinner with a microwave oven reader. The local time of day is 8:00 AM, so it is less likely the user is planning to cook the frozen dinner at this time. Historical use patterns indicate that the user has never programmed the microwave oven to cook frozen dinners in the morning. The household inventory, stored on a server to which the microwave oven reader is connected through a network, indicates current level of frozen dinners is one unit. It is currently winter, and historical use patterns indicate that frozen dinners are cooked frequently during the winter months. The microwave oven reader transmits relevant information to an information resource, in this case an Internet server indicated in the MRL device, and receives a menu with several options, responses to each of the options being included in the transmission. The options include an identification of a local store at which frozen dinners are on sale, similar products the user may want to try, and instructions on how to heat a large number of frozen dinners for a dinner party. If it had been dinnertime, the information resource might have returned simply cooking instructions.

Another issue that relates to the potential for widespread acceptance of MRL devices is that people are less likely to adopt the habit of using new technology, especially when its use requires adaptation, when the technology is usable in only certain circumstances. So, for example, if only some products purchasable at a supermarket were fitted with MRL devices and others not, consumers would require two different ways of performing the tasks that the MRL devices otherwise automate: one for articles fitted with MRL devices and one for articles not so fitted. Thus, for example, MRL devices have the potential to automate the tracking of food inventory, the making of shopping lists, and the determination of the sufficiency of on-hand goods for making a recipe. If, however, only part of a shopping list can be made, or only half the requirements for a recipe automatically determined, the utility of such automation is greatly diminished. Thus, according to certain features of the invention, MRL devices may be provided for articles that are not prepackaged, such as consumables like delicatessen goods, produce, meat, etc.

While it has been proposed that MRL devices and barcodes be used to connect users to web sites for purchase of goods, this degree of automation merely avoids the need for the user to enter a web address. This idea is basically the same as the Cue Cat® system. Since machine-readable symbols like MRL devices can bring users to a web site quickly, they have the potential to facilitate impulse-purchasing. There is a much greater likelihood of a sale when a user is provided an opportunity to buy a movie soundtrack just as the user leaves the movie with the music still fresh in his/her mind. This could be done by placing an Internet terminal in a self-service kiosk at the theater. The smaller the number of steps involved, the more likely a sale will be completed. In an embodiment of the invention, a MRL device is attached to a ticket stub. The device may contain an address at which the movie soundtrack can be purchased. Moreover, the device contains sufficient data density to correlate or store account, authorization, shipping, and authentication information to allow the purchase to be completed without any prompting from the user aside from the selection and confirmation of an item to be purchased. If a theatergoer purchases tickets using a credit card, the account can be linked temporarily to data on the MRL device on the ticket stub. This data can further link an order process to preference information contained in user-profile database and the purchase used to augment that database. To protect the user's account, the connection between the user's credit account and the ticket data may be given a predefined expiration period, say 2 hours after the movie or other event is over. As an inducement for the user to purchase at the theater, the user can be given a discount incentive such as lower price on his/her next ticket purchase, discounted price for the goods ordered, or a free gift. Precisely the same functionality can be provided through a portable terminal rather than a kiosk terminal or a home computer connected to the network; or even a portable computer or terminal.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
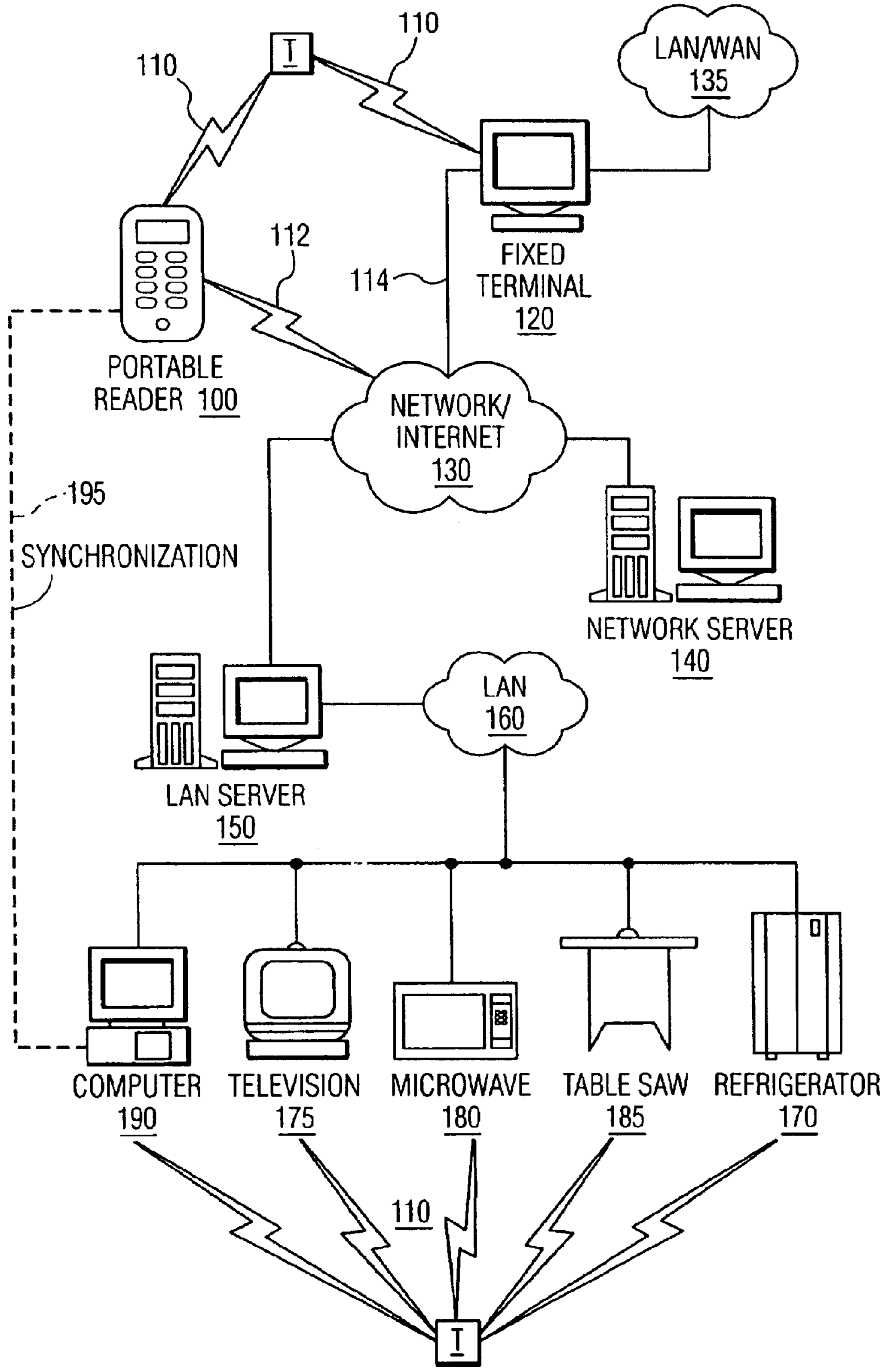
FIG. 1 is a figurative diagram of a hardware configuration for implementing an offline data transfer operation according to various embodiments of the invention.

Referring to FIG. 1, a MRL device T is prompted by, and transmits data to, a portable reader 100 or a fixed terminal 120 with an integrated reading device. Note that the reader 100 may be integrated into another appliance, such as a personal digital assistant (PDA) or cell phone or other. In an embodiment, the MRL device T is a radio transponder that generates RF links 110 with readers 100/120. The RF links 110 may be momentary according to known transponder technology. Alternatively, the links 110 may represent data transfer corresponding to any high data density transmission method including scanning of printed symbols such as two-dimensional bar-codes, contact reading of a memory token such as an iButton® or smart cards, or reading of a magnetic stripe on a surface. The particular medium is independent of some aspects of the invention.

The portable reader 100 and fixed terminal 120 may be linked to a network or the Internet 130 by wireless and/or wired links 112 and 114, respectively. Also connected to the network/Internet 130 are one or more network servers 140, which may be operated by commercial services. A local area network (LAN) 160 is connected through a LAN server 150 to the Network/Internet 130. The LAN 160 connects the LAN server 150 to various devices including a computer 190, and various smart appliances 170–185 including a television 175, a microwave oven 180, a table saw 185, and a refrigerator 170.

The smart appliances 170–185 are all network-enabled, meaning they each have a microprocessor and at least an input or output device to communicate with a user. For example, the table saw 185 may be enabled to receive software from the Internet to permit it to implement a safety feature or the microwave oven 180 may have a terminal, including a display and keyboard, for displaying recipes taken from the Internet. Smart appliances are discussed widely in the published literature and are not discussed in further detail herein. Each of the smart appliances 170–185 may be equipped with a fixed reader (not shown separately) capable of reading the MRL device T. Data may also be transferred from the portable reader 100 to a device such as the computer 190 by a temporary wired or wireless connection 195 as used for synchronizing data on personal digital assistants and notebook computers. When the reader of a smart appliance 170–185 or home computer 190 reads a MRL device T, it may interact with the user responsively to data in the device and to various data stored on the LAN server 150, the computer 190, or on the network server 140.

Figure 2:
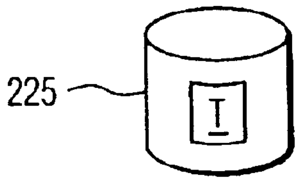
FIG. 2 is a figurative depiction of an arbitrary product, or product packaging, with a MRL device affixed to it.

Referring to FIG. 2, the MRL device T may be affixed to any article, for example, a product package 225. Alternatively, the MRL device T may be attached to a shelf unit or case (not shown) near the product package 225. The essential feature is that there is some physical or abstract association between an article and a MRL device. A consumer encountering the product may hold the portable reader 100 close to the MRL device T of the product package 225 and activate the reader 100 to read the MRL device T. In response, the MRL device T transmits data stored in the MRL device T of the product package 225 to the reader 100. The reader 100 may then transmit the data acquired from the MRL device T, along with other data in its memory M, through the network/Internet 130 to the network server 140 and/or the LAN server 150. Alternatively, a consumer or checkout clerk, during purchase, may scan the MRL device T of the product package 225 using the fixed terminal 120 in a similar manner. The fixed terminal 120 may then transmit the data acquired from the MRL device T, along with other data stored within the fixed terminal 120 or, more likely, in a (e.g., retailer's) server (not shown) connected through the LAN/WAN 135, through the network/Internet 130 to the network server 140 and/or the LAN server 150.

Note that when a MRL device is associated with multiple units, it may be more convenient for it to operate at a distance. For example, a shopper's portable reader passing by a shelf unit with 40 cans, each with a MRL device T, would receive a barrage of data. But if a single MRL device on a shelf "spoke" for an entire group, it would be convenient for the shopper's reader to receive data continuously and at a distance. In such a case, the reader's programming may permit passive scanning and allow a user profile to determine if the user should be notified. See discussion referring to FIG. 28 infra.

Figure 3:
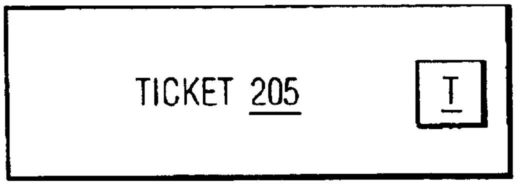
FIG. 3 is a figurative depiction of the front side of a ticket stub with a MRL device affixed to it.
Figure 4:
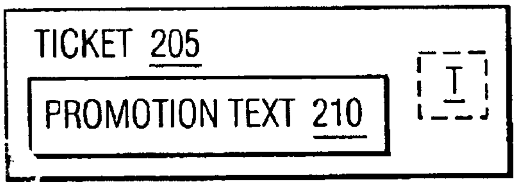
FIG. 4 is a figurative depiction of the back side of the ticket stub with a MRL device affixed to it.
Figure 5:
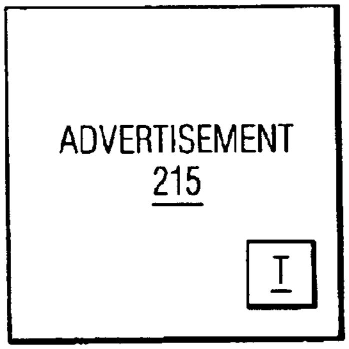
FIG. 5 is a figurative depiction of an advertisement (magazine, billboard, poster, etc.) with a MRL device affixed to it.

Referring now to FIGS. 3 and 4, a MRL device T may be affixed to a variety of articles other than purchased or purchasable goods. For example, the MRL device T may be affixed to one side of a ticket 205 such as a train, movie, show, airline, or other kind of ticket. Alternatively, the ticket may be a coupon, a receipt, or any other type of article associated with a service or product. The ticket, receipt, etc. 205 may have text 210 on it explaining, for example, a promotion of which the user can take advantage by scanning the MRL device T and taking some action accordingly. Referring to FIG. 5, similarly, an advertisement 215 such a billboard, a poster, a magazine advertisement, or other such medium may have a MRL device T affixed to it for the same purpose.

Figure 6A:
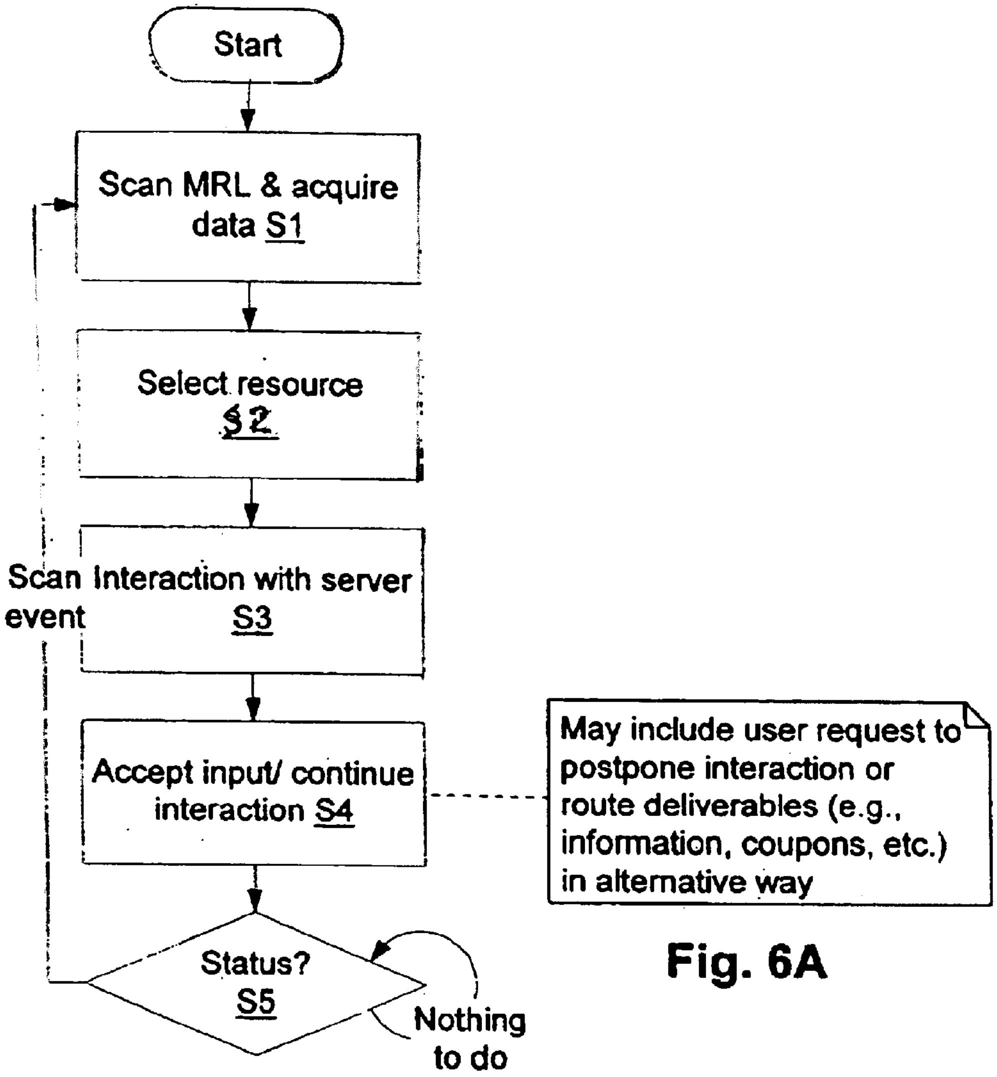
FIG. 6A is a flow chart representing a process followed by a MRL device scanner for online data transfer according to an embodiment of the invention.

Referring to FIGS. 1 and 6A, a process that may be implemented based on the hardware environment of FIG. 1 allows a user to receive targeted promotional information through a fixed terminal 120 or portable reader 100 while shopping, for example. Assume the user chances upon a display, advertisement, or purchasable product and is interested in purchasing or learning more about it. For example, the object could be a movie billboard and the user wishes to determine where and when the movie may be seen or to read a review. For the other example, the object may be a food product and the user wishes to know further nutritional information about it or how it can be prepared for eating. The user scans the MRL device T causing the reader 100/120 to acquire data from the MRL device T in step S1.

In step S2, an interaction may be initiated between the reader 100/120 and the LAN server 150 or Network server 140 beginning with the transmission of data to the network server 140. For example, the data transmitted may include data from the MRL device T plus other information, the other information including, for example, the identity of the user and/or certain profile data characterizing the user. Included with the information from the MRL device T may be a network address to which the reader 100/120 may connect to complete the information exchange. The interaction is continued as defined by an interaction process running on the server 140 at step S3. The data exchanged in the interaction may include data responsive to the acquired data, further user input S4, and/or data stored on the network server 140. Generally, it is contemplated that the interaction would be conducted in accord with, and by means of, a client-server process, for example using HDML (handheld device markup language), a markup language for small wireless devices or HTML (hypertext markup language).

Profile data characterizing the user may be obtained from the servers 140/150 in various ways. The reader 100/120 may store this information. Alternatively, the user may have a unique identifier that is correlated with profile data stored on the network server 140 belonging to the owner of the network address stored in the MRL device T. Still another alternative is for the profile data to be stored on a third party network server 140 with which the owner of the addressed network server 140 has a relationship.

To give an example of an exchange, imagine that a shopper scans a pair of tennis shoes at a department store. The user's reader 100 acquires a unique identifier from the MRL device T, a unique identifier indicating the owner of the reader 100, and an address corresponding to the network server 140. The reader 100 then transmits these data to the network server 140. The network server 140 runs an interaction process that receives these data and identifies a subprocess that corresponds to the received data. For example, the network server 140 might be owned by the manufacturer of the tennis shoes. The interaction process may look up information about the particular pair of tennis shoes whose MRL device T the user scanned, the date of manufacture, the style, the store to which it was shipped, and so on. The interaction process may also acquire personal profile information about the user from its own internal database or a subscription to a third party database stored on a further network server 140. The personal profile information may contain such data as the style (contemporary or traditional), amenability to participant sports and type of sports, color preferences, etc. Included among the information about the particular pair of shoes may be, for example, that they came from a lot that has been recalled. The interaction process may also retrieve information indicating that the quality of the shoes is not consistent with previous purchase patterns of the user. The interaction process may also retrieve information indicating that the user plays other sports than tennis. In response to all this data, the interaction process may be defined such as to generate an up-selling recommendation by suggesting a higher quality type of shoe. Further the interaction process may be such as to generate a cross-selling promotion indicating to the user that the particular store to which the shoes were shipped is having a sale on tennis racquets (the reasoning behind the programming of the interaction process being the conclusion that the user is new to tennis and may need the equipment).

The interaction process may be a very simple one, consisting of the generation of a single message promoting a product, for example. Alternatively, the interaction process may request feedback from the user as in step S4. For example, it may provide a menu with a number of options that may be generated on the display of the reader 100/120. For convenience, the user may be given the option, outright or in the course of the dialog process, of marking certain information, or even the entire interaction process, for later review and completion. Alternatively, the user may be given the option of receiving the data by email or having it stored locally on the reader 100/120 for later review and interaction in the way one currently may save an HTML file locally and interact with links within it when connected. After the reader accepts input in step S4, it may continue an interaction iteratively until completed depending on the incidence of scan events in a status monitoring loop at S5.

Figure 6B:
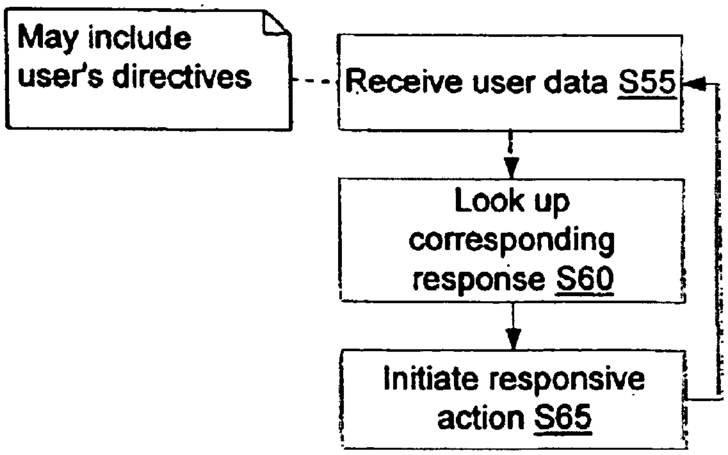
FIG. 6B is a flow chart representing a process followed by a server for online data transfer according to an embodiment of the invention.

Referring now to FIG. 6B, at the server side, the interaction begins at step S55 with the receipt of data from the reader 100/120. The appropriate dialog process is selected at step S60 and begins at step S65 accordingly. The data received at step S55 may include directives from the user such as a preference that any selling information be sent to him/her by email or simply discarded.

Inputs may be matched to responses using various information retrieval techniques used for matching search templates to information resources such as documents or interaction processes. The area of information retrieval is a vast and fast-growing technical area, a detailed discussion of which is outside the scope of the present specification, except as indicated herein. Note that the term "resource retrieval" might be more apt to describe the invention because the response desired may not simply be a static piece of information, but a process, such as an interaction with the user or a control function such as used for programming a microwave oven. The WWW currently provides ample examples of processes that are retrievable by searches, such as equipment control, transaction, monitoring, etc., so this point need not be elaborated upon.

In prior art bar-code readers and RFID tag reader technology, the process of matching responses stored in a resource space to the context of a scan event focuses either on the article to which the bar-code or RFID tag is affixed or the device to which the reader is connected. In other words, none displays an ability of one reader to perform multiple tasks based on the combination of variables, at least including the type of reader and the type of article identified by a MRL device. This ability may be called "context versatility." Here is a representative list of examples of prior art concepts. Most of these call up a resource, such as a web site, and then require the reader to navigate a menu tree to get to the desired result.

- Portable bar-code reader used to order a product, get directions to a store, make reservations, by scanning a bar-code in a magazine, newspaper, brochure, or other printed advertisement.
- Scanning bar-codes in a catalog to fill an online "shopping cart."

Scan a bar-code and have further information routed to you by email.

Order film soundtrack, sports memorabilia, etc. from a bar-code printed on ticket stub.

Obtain competitive pricing after scanning a SKU or order items related to the article identified by the SKU.

Cue Cat®—Scan a label and a server connects a web browser directly to a site corresponding to the label. No context responsiveness.

The above examples are all entirely dependent on the bar-code scanned and the data entered (e.g., a menu) by a user. This simply corresponds to the automatic linking of a terminal to a particular web site. The next items do provide context-responsiveness in a sense, since in each one, a particular response is generated by a particular reader. But these are blue-sky proposals or research projects and the papers on the subjects provide scant information on how the results would be achieved or context-versatility.

Scan an RFID tag on a frozen dinner with a microwave oven reader to program the microwave oven for that particular frozen dinner.

Scan the contents of a refrigerator with a refrigerator reader to update household food inventory.

Determine the contents of cabinets in a kitchen by scanning RFID tags of items, such as pots, etc.

Place a coffee cup in a coffee maker and the coffee maker plays music and makes the particular kind of coffee preferred by the user designated by a RFID tag built into the cup.

A system that gives instructions for a recipe while the user is making the recipe. The system advises on substitutions based on personal preferences of the user or availability of ingredients in the household inventory.

In these examples, the response of a system is not dependent upon the MRL device contents, but on the type of reader. For example, a kitchen cabinet reader would update the household inventory, but presumably a register reader would create a register receipt and debit an account both using the same MRL device. But in these prior art systems, the response of the reader is predetermined by its programming. A given reader is programmed to respond in a particular way to a particular MRL device.

Consider the economics of providing greater versatility. A manufacturer of the article to which the MRL device is attached would find it unprofitable to program to accommodate unique responses for unusual scenarios. For example a cereal manufacturer would be unlikely to bother drafting a unique and useful response for an event like scanning a box of cereal with a table saw reader. The number of such requests would not justify the cost of creating a unique response for such a rare event.

The prior art information retrieval processes are niche processes designed for a particular MRL device or bar-code and type of reader. However, such rare events could comprise a large proportion of scan events, if intelligent responses were generated by the system. For example, suppose the user in the previous example wished to build a shelf unit that could support boxes of cereal? Or supposed the user was eating cereal as a snack while working in his/her tool shop? In the former case, there is intelligence in the cereal box that could be used to tailor a response, that is, that the cereal box has certain dimensions. In the latter case, there is intelligence in the type of reader, for example the indication that the user is likely in a tool shop as opposed to somewhere else. This hidden intelligence could be used to select a relevant response. In the first case, the table saw manufacturer might have sufficient demand for plans for shelving units for it to make sense to provide a number of plans. Also, a cereal manufacturer would probably have information about cereal (or other products that could be cross-sold) that is particularly relevant to users who like to eat cereal as a snack.

As discussed above, there are advantages to providing a high degree of versatility. The motivation for doing this is that unusual scenarios like the scanning of a cereal box with a reader built into a table-saw could be a commonplace if useful results could be obtained. For example, users would be more likely to use a system if its results were more relevant to them, thereby increasing the probability of its use exponentially. Using hidden information also permits the system to respond automatically, avoiding the need for user input (as for navigating menus), or at least reducing the need for such input. Also, suppliers of content to readers can exploit the "hidden" information in requests for information for directed marketing.

In addition to using the context to filter a large number of options down, the invention seeks also to provide an infrastructure capable of providing this kind of versatility economically. The approach is to use known components of resource retrieval technology in a novel combination for the retrieval of resources in the domain of MRL readers. At first blush, it seems strange for anyone to manufacture a table-saw reader unless an attractive use for MRL devices in connection with table-saws could be found. The obvious approach under the prior art model is to design the reader to deliver instructions from the table-saw manufacturer for various kinds of work-pieces that might be used with the table saw or for the cereal maker to do the same. A table saw manufacturer might provide information such as the kind of blade that may be used with a piece of plastic labeled by a MRL device or instructions on how to install and adjust a Dado blade. However, this monolithic model in which a manufacturer or vendor must anticipate precisely how products will be used in order to provide useful resources in response to a scan, is highly limited and inflexible. So, as in the example, the table saw reader is likely to be unable to respond with more than a generic response based solely on the MRL device of the box of cereal.

Figure 7:
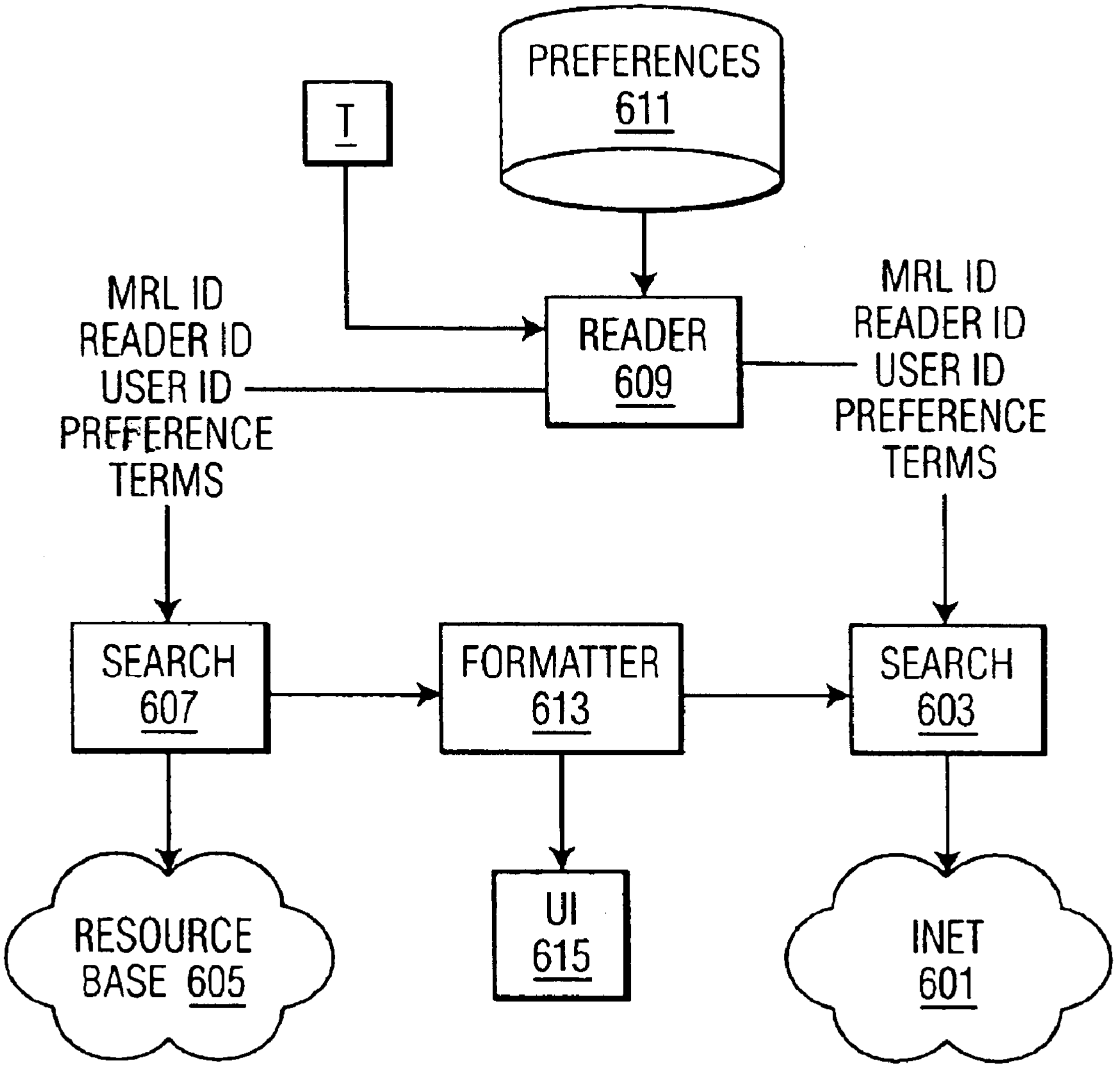
FIG. 7 is an illustration of a system by which a MRL reader may simultaneously perform a search of a structured resource base and a fuzzy search of an unstructured resource base to obtain results that may be combined for display by a user interface (UI) according to an embodiment of the invention.

Referring to FIG. 7, a system to make the connection between resources and a reader uses components of modern information retrieval technology to provide flexibility. A reader 609 receives data from a MRL device T and transmits this data, along with an identification of a user (or user profile data from a preference data resource 611) and an identification of the reader to search engines 603 and 607. The search engine 607 is programmed to search one or more resource bases indicated symbolically at 605, for example a resource base maintained by the manufacturer of the product identified by the MRL device or the reader 609 manufacturer. It is assumed that the search engine 607 is programmed to accept the indicated input data and that typical formatting steps are employed to formulate a query and obtain results which are the output to a formatter 613. This type of search process is essentially the same as contemplated systems in the prior art.

The search engine 603 searches the Internet 601. For example, the search engine 603 could incorporate a search engine such as Google®. The query used for searching is, preferably, generated from the contents of the MRL device T either directly or indirectly. For example, if the MRL device contains only a serial number, it may be necessary for some process (not illustrated) to look it up on a remote server, or perhaps a database in the reader 609, to determine what the MRL device is connected with. Alternatively, the MRL device may store one or more characterizations of the article to which it is connected. For example, it could contain the label "sweet breakfast cereal," and/or "Cap'n Crunch®." Once the nature of the article identified in the MRL device is determined, it can be incorporated in a search query by the search engine 603. A characterization of the reader may be done in the same way. The reader may be programmed to provide a unique identifier code as well as a characterization (or multiple alternative characterizations) of itself for purposes of formulating a query for an Internet search engine. The characterization of the reader may also be incorporated in the query. The same may be done with any profile data. For example, the query could contain a particular set of profile data that is specifically set aside for Internet searches. Alternatively, the profile data may be left out for the Internet search by the search engine 603. The query may employ a template, or set of templates for alternate queries, with slots for the characterization of the reader and slots for the characterization of the labeled article. For example "Use [reader] with [article]" or simply "[reader] AND [article]." The results retrieved by the search engine 603 may then be sent to the formatter 613 and arranged into an output to the reader 609 via a user interface (UI) built into it.

Note, the term "resource base" is used here to identify any kind of data space that is computer-addressable including the World Wide Web, databases, servers such as news feeds, media feeds, with connections via packet and switched services such as the Internet and regular telephone and cellular phone services. Resources in the resource base may be data or process objects so that the resources found in searching the resource space may result in the initiation of a process, such as the automatic control of a remote system, the automatic initiation or completion of a transaction such as a bank deposit, or the initiation of a dialog with a user using the reader 609. The resource base may be made and maintained by any entity and can be a conduit, such as a web content aggregator, that combines resources from several sources.

Figure 8:
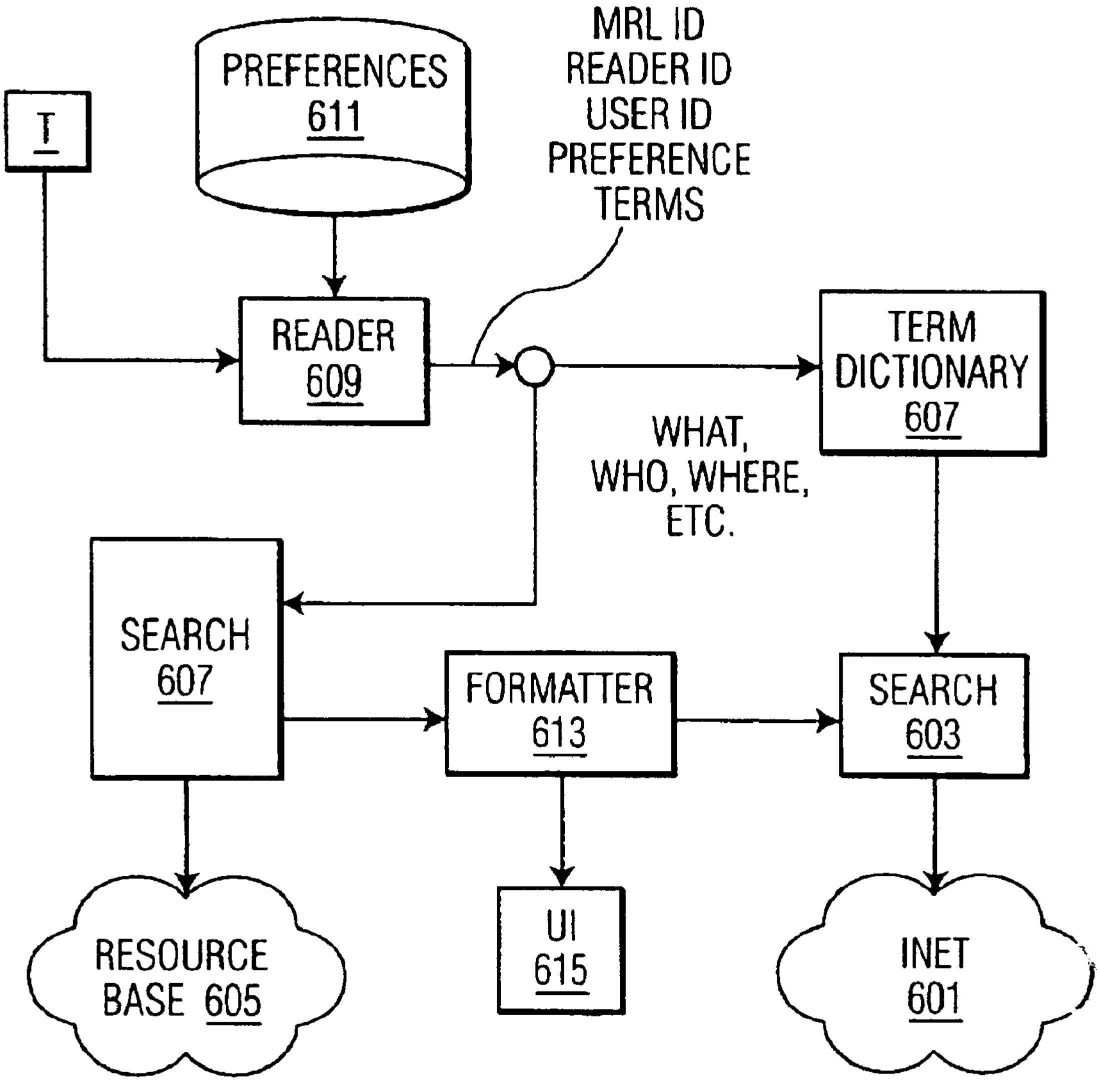
FIG. 8 is an illustration of a system by which a MRL reader may simultaneously perform a search of astructured resource base and a fuzzy search of an unstructured resource base to obtain results that may be combined for display by a UI according to another embodiment of the invention in which terms in a query are expanded unconditionally.

The system of FIG. 7 highlights a potential shortcoming. The Internet search engine 603 will generate a query that may be too narrow to produce meaningful results. For example, there may be few resources that contain text or metatags with Cap'n Crunch® and "table saw" or, at least, these are likely to be only a fraction of the resources that could potentially be relevant. Referring now to FIG. 8, this problem may be addressed by providing a further stage to the input-gathering process. In the present embodiment, preference data is obtained from a preference store 611, MRL data from a MRL device T, and reader data from a reader 609, as discussed relative to the FIG. 7 embodiment. The characterizing terms, however, are filtered through a term dictionary 607 before being incorporated in a query by the Internet search engine 603. The term dictionary 607 provides words and phrases that have some relationship to critical terms supplied by the reader 609. These relationships can be synonyms, hypernyms, terms that indicate where or how a thing characterized by a search term is normally used, etc.

The need for the dictionary 607 is that the user is unable to, in the scenario of using a particular reader to scan a particular item, to specify what it is about the item or the reader that is relevant. For example, if the user was concerned about making a storage unit with the table saw and the box of cereal simply provided external dimensions for articles to be stored in it, this much would be inferred by the search process from the circumstances. Thus, the embodiment of FIG. 7 may be substantially improved by adding a further process to generate alternative terms that are linked in some way to the terms characterizing the reader and the article to which the MRL device is attached.

An example of a type of dictionary that is currently used in formulating search queries from an input search query is a thesaurus of synonyms. The present application would benefit most from a dictionary that provides the kinds of relationships among the terms in a query that may allow a context to be derived. For example, the term "table saw" can be related to genus words (hypernyms) like "tool," or to its parts like "saw blade," or to locations such as "wood shop" or more generically "hobby venue."

An example of a dictionary that relates terms to other terms along a variety of different dimensions is WordNet, a lexical dictionary used in the field of computational linguistics. WordNet relates words to other words that are related to a subject word along various dimensions. It provides hypernyms, antonyms, meronyms (meronym is a word that names a part of a given word), holonyms (holonym is a word that names the whole of which a given word is a part), attributes, entailments, causes, and other types of related words. Such a dictionary could be used to create alternative queries that would have a much higher likelihood of producing useful results under certain circumstances, such as the table saw/cereal box example. Thus, a dictionary that provides terms naming a place where a reader is likely located might be used. So, for example, the search process might correlate table saw with basement or workshop as the place where the table saw would normally be located. Since the terms can, in many instances, be identified with an object very specifically, for example, the precise box of cereal including its date of manufacture, the type of paper its packaging is made of, and the expiration date stamped on the package, the related information can be very precise. Thus, a "dictionary" may be created to provide a set of additional terms that are related in various ways to terms generated directly from the context. For example, the relationships can be such as:

1. how a named object is used,
2. where a named object is used,
3. when a named object is used,
4. the language spoken in a destination city,
5. physical dimensions of an identified object,
6. other characteristics of the named object, etc.

The list is far from exhaustive, but simply intended to illustrate the idea by way of example. Instead of formulating a single query (or several based on synonyms from a thesaurus or alternative terms by stemming), significant terms in the original query may be selectively expanded by means of a specialized "dictionary."

The purpose of the dictionary 607 is to multiply the kinds of information available in a query based upon nouns characterizing the article to which the MRL device is attached, the reader, terms defining preferences, and any other data. As mentioned previously, however, a variety of different kinds of information can be provided at the outset, without requiring a separate dictionary. For example, the MRL device T could point to a particular article by means of a data resource, say a database maintained by the manufacturer of an article to which the MRL device was attached. That database may contain a set of alternate terms that serve to identify the object, the places it is normally used, ways it may be used, its physical dimensions, etc. The MRL device T could contain these alternate terms at the outset. But such an arrangement presupposes that the entity that provides information about the article has chosen to provide all the information that could be relevant about the article. Also, preparing and maintaining the currency of this kind of data can be onerous unless there is a significant incentive for the entity with access to the data. In some cases this is virtually impossible (for example, the location of a portable reader at the time of the scan) and in practice, it is likely to be very difficult simply because (e.g., the delicatessen that prepared the potato salad) not all parties involved will have the resources to provide all the information required. The alternative is for the system to have a generic dictionary that it can use to expand any terms, and filter the results based on the quality of the matches obtained.

For an example of how the term dictionary can help provide a meaningful context, if the reader 609 is associated with a cement truck and the query identifies the reader as a cement truck, the term dictionary 607 may provide a hypernym for the cement truck, returning "vehicle" or its standardized equivalent. In a query in which a Coke® was scanned by a cement truck reader 609, the resource space is more likely to be populated with responses pertaining to Coke® and vehicles than it is to contain cereal boxes and cement trucks. For example, the query might generate a response indicating where the product in the cereal box can be purchased. Just to complete the example, one can imagine a worker wishing to purchase a case of Coca Cola® on his way back to a station and it being convenient for him/her to stop while in a cement truck.

As in the system of FIG. 7, the outputs of both search engines 603 and 607 are supplied to a common formatter for application to a UI 615. Note that the UI 615 can be a local process on the reader 609 or a remote process on a server as may be the formatter 613. Note that the term dictionary 607 may be multiple separate processes rather than just one. These may be local (incorporated in the reader 609) or remote (addressable by the reader 609). Preferably, one or more generic dictionaries may be maintained by one or more service providers.

The input terms may be descriptors chosen by authors and incorporated in MRL devices or a database correlating the MRL device identifier with the descriptors. In situations where these descriptors have not been expanded in advance, the generic dictionary process 607 handles it. An example of its use is the case of the delicatessen preparing a potato salad. The only information about the article is the terms "potato salad," the date it was prepared, the date the potatoes were boiled, the ingredients list, the weighed size of the original quantity sold, and an identification of the vendor who prepared and sold it. In this case, the precise size of the container, a location where it is normally found (e.g., in a refrigerator or at a dining facility) and other precise information about the article, the reader, or other descriptors that might appear in a query are not available. But in such cases, for such terms, a dictionary built around the generally-recognized meanings of words and other terms, may be employed to expand the search terms.

The above example of a cement truck and a case of Coke® may seem far-fetched, but one of the goals of the inventive system is to provide value in rare circumstances for which it might otherwise be too expensive to create links to particular resources. As discussed, such rare circumstances may account for a significant percentage of the opportunities for using the system. There is a synergistic benefit to providing meaningful responses to unusual requests. It means that users can anticipate that the system is useful most of the time, even when the circumstances are not paradigmatic. The more often the system can be used, the more likely the user will turn to it when more common circumstances permit. It may also prove to be fun for a user to discover some unimagined connection between where s/he is currently, what s/he is doing and some object identified by a MRL device. This can create powerful marketing opportunities.

One way the search process can be improved is to insure that queries and the indices employed by the search engines 603 and 607 use the canonical form of query terms. The canonical forms may include stemming and replacement, if necessary, by one chosen canonical stem term to replace a variety of synonyms of the stem. This would be done with query terms and descriptive text (including metatags) in the resources. This may not be necessary in some instances. For example, a reader may always characterize itself using standard terms and variants. The advantage of allowing resources to use terms other than standardized terms is that it allows them to be generated more easily and by persons with less technical sophistication. Creators of resources can simply borrow descriptive language from another source or draft it without being concerned with conforming to a standard vocabulary.

Figure 9:
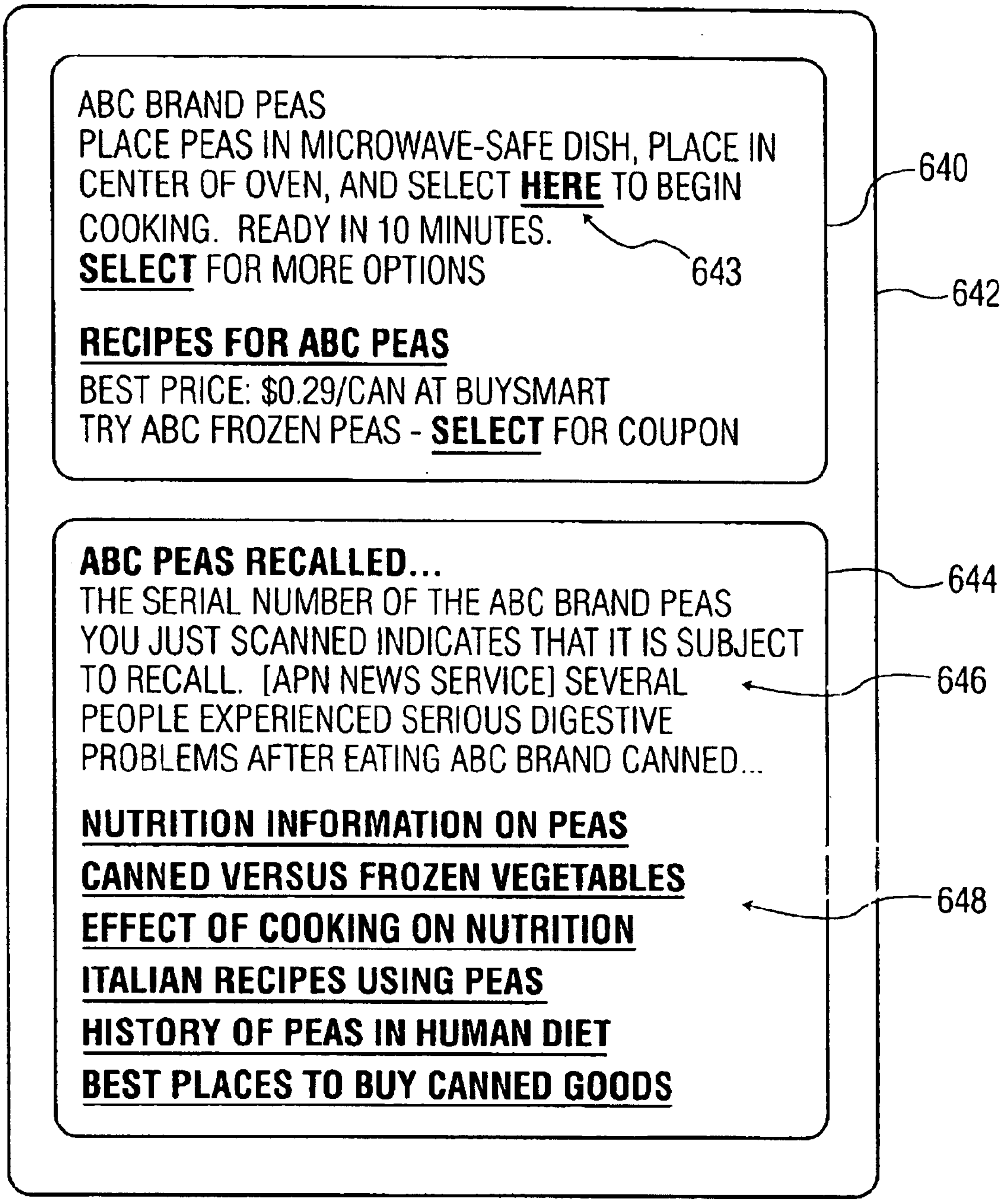
FIG. 9 illustrates a UI element for displaying results obtained by the systems of FIGS. 7 and 8.

Referring now to FIG. 9, the UI 615 may display a result such as indicated in an illustration of a display 642. Two display regions are shown: a first region 640 for displaying results from the search by the search engine 607 and a second region 644 displaying results from the Internet search by search engine 603. The first region 640 indicates instructions at the beginning of an automatic microwave oven programming process. The reader 609 display 642, which could be built into the microwave oven, provides a control 643 to begin the cooking process and another control 643 to allow the user to opt-out of proceeding ahead with cooking to go to a menu providing further options. The regular search engine 607 also generated a result for advertising a sale at BuySmart and for cross-selling another product, namely frozen peas with a coupon incentive which the user may select to receive by email or some other means. The second region 644 contains high priority region 646 and a low priority region 648. Search hits that are deemed high priority, for example by the confidence level of the hit, such as indicated by most Internet search engines and used for ranking results (e.g., by TF*IDF) are displayed in the high priority region 646 and expanded. The results with lower ranking are displayed in the low priority region. Other criteria may be used to rank the results, such as the presence of an indicator, in the resource, to a health warning.

Figure 10:
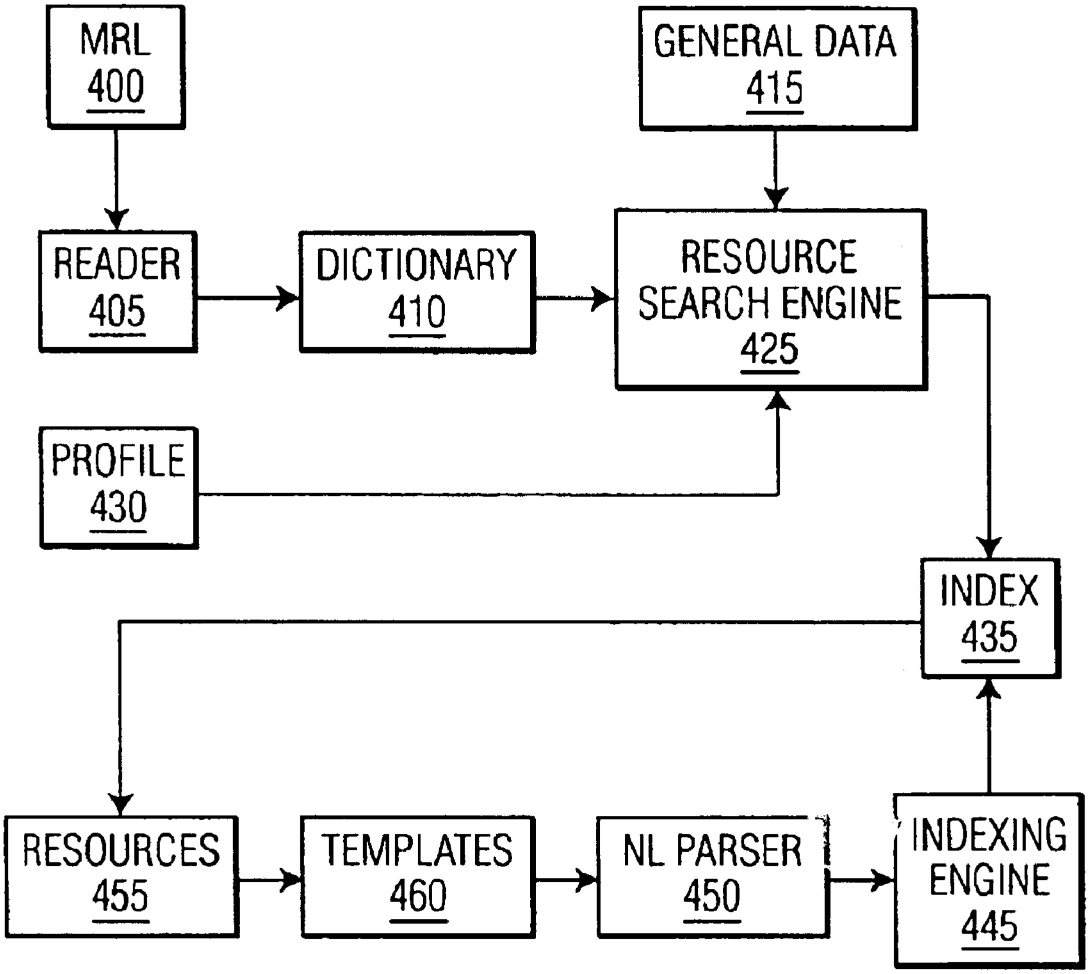
FIG. 10 is an illustration of a system for searching a resource base that uses a natural language parser to generate an index for matching resources to the results of MRL scans and attendant contexts.

Referring now to FIG. 10, the most sophisticated search engine technology currently available employs natural language (NL) processing to parse search queries generated by users. For example, a user can formulate a search by typing in a question in the AskJeeves® search engine. The sentence typed in by the user is parsed to identify the most important terms. Noun-phrase identification, stemming, conversion to canonical terms, etc. may be performed. More sophisticated techniques may allow for greater semantic discrimination in the search query. In the current system, these techniques may not be required in the front-end process of creating a query vector, since the MRL device, reader, and user preference model may be such that the respective terms they contribute are unambiguously tagged to indicate the meanings of the terms they contribute. So, for example, the reader can identify itself as a reader mounted on a table saw and the MRL as an identifier of a particular brand and type of cereal made on a date-certain at specified place, etc. Note that, as discussed elsewhere, however, this information may simply be correlated to a unique identifier stored in the MRL device.

Thus, there is no need for information extraction using NL techniques for determining the semantic structure of the data incorporated in the query. However, such NL techniques can be very useful for determining the semantic structures of unstructured response databases, such as the WWW.

Relatively unstructured response databases are much easier to create and grow than highly structured ones. This may be key to the development of rich data resources that will contribute to the vision of a future in which users can scan just about anything anywhere to obtain responses they truly value. In fact, contributions can come from the users themselves, as users contribute to the WWW. Since, in many instances, a scan event may be very predictable, for example scanning the MRL device of a frozen dinner with a microwave oven's scanner, it is desirable for some responses, in such circumstances, to be retrieved directly without resort to the filtering of large quantities of unstructured resources. Thus, it is desirable for structured databases to exist alongside unstructured ones, or for the search mechanisms used for searching unstructured resources to produce predicted results. For example, a manufacturer could plant unique metadata in its web sites that correlates with certain MRL and reader data to guarantee the search process retrieves the desired resource with a high confidence level (i.e., desired response is weighted highly relative to all others and so is guaranteed to be in the short list of returned results).

The invention and prior art search techniques can identify a particular resource and invariably generate an indication of goodness of fit, i.e., a measure of how appropriate each response is to the given set of input data. The response(s) is (are) then selected based on which produced the best fit to the input data. Assume the input data includes a noun characterizing the type of reader (e.g., "microwave oven" or "cement truck") and a noun characterizing the object to which the MRL device is associated (e.g., "frozen dinner" or "can of motor oil"). For a simple illustrative example, the information provider's server might have, say, three responses, (1) one for programming a microwave oven for a frozen dinner, (2) one giving instructions on how to add motor oil to a cement truck, and (3) one giving navigating instructions on where to buy frozen dinners. Each response has a corresponding template indicating an input vector that matches each response. In this example, template for response (1) might be [reader=microwave oven, MRL device=frozen dinner]; the template for response (2), [reader=cement truck, HDRM device=can of motor oil], and the template for response (3), [reader=car or portable reader, MRL device=frozen dinner]. The template's factors may also be weighted (in Bayesian network fashion). An input vector matching any of these templates perfectly would cause the information provider server to generate a very high goodness of fit ("confidence") indication for one of the responses and a low one for the others. A template matching only one component of the input vector would produce a lower rating. If no other match competed with this lower rating, then the corresponding response might be generated by the server. The latter situation would result in multiple good fits and might require a request for further information to make the correct choice clearer.

The above examples are trivial. In large databases, the fit between input vectors and responses may not be provided by a weighted factor template as in a Bayesian network (or neural network or other machine-intelligence technique) because they are so time-consuming to program (train). A more practical way to make a response database is to draw on technology being used in search engine and question-answering systems where the criteria for selection and the contents of the responses are natural language descriptors. In question-answering systems (or frequently asked question; FAQ selectors), a natural language (NL) question is parsed to identify the most significant terms. These are then compared to templates in the FAQ database. The templates are derived from the questions to which the corresponding answers are responses. An extension of this technology would be for the templates to be ordered sets, each element corresponding to a particular type of input. For example, a first element could correspond to "whom," indicating one or more identifiers relating to the type of person making a request and the values indicating male adult, female child, ethnicity, age, etc. Other elements might correspond to the location of the requester, for example a value could indicate "moving in a vehicle," "at home," "at work," etc. Other element(s) could relate to the type of reader being used such as "microwave oven," "table-saw," or "kiosk." The input vector may be ordered in the same way. One way of expressing the ordering is by data-tagging, for example using XML.

In practice, processes for matching inputs to responses using either-or comparisons between the components of input and template vectors could be used to correlate responses quite effectively in a practical system, even though the number of responses and input combinations may be high. Usually in programming such a system, many vector components would be ignored, reducing the size of the input vector space. Also, the provider may classify the kinds of requests to be received, and provide some default response when no input vector matches a response template. For example, assume the information provider is a manufacturer who provides information to support purchasers of its products. The manufacturer may match each request identifying one of its products to a corresponding set of responses. Each of the responses may be created for dealing with a particular reader that was expected to be used for scanning the attached MRL device. For instance, for frozen dinners, the reader component of the input templates might include various models of microwave ovens, regular ovens, and hand-held portable readers. When the product fails to match one of the anticipated devices associated with the reader, the server programming might generate a default response.

In FIG. 10, a configuration that uses a dictionary on the resource side of the system is illustrated. A MRL device 400 is read by a reader 405. The reader 405 applies relevant characterization terms resulting therefrom to a dictionary process 410. The dictionary process 410 generates alternate terms as discussed above and applies these to a resource search engine process 425. The resource search engine process may optionally receive general data 415 and profile data 430, such as preferences and characteristics relating to the user. The resource search engine process 425 then generates a set of alternative search queries with which it searches an index 435. The index is generally regarded as a data object part of the search engine process, but here it is illustrated separately to facilitate discussion of the embodiment.

On the resource side of the system, the index is populated by an indexing engine 445, which filters resource templates 460 through a natural language parser 450. The resource templates 460 are descriptors of the various resources available in a resource base 455. In databases, these descriptors can be the contents of the database itself, or separate fields used for searching, like tags (e.g., XML) used by some resource bases like WWW sites (e.g., metatags). Here, the resource templates 460 contain the terms that characterize the records in the resource base 455. The templates are not precisely configured as in a normal database. In fact, the resource templates 460 may simply be text abstracts describing the contents of the resource. Alternatively, the templates may be subsumed within the records of the resource base 455. The use of natural language abstracts as templates (or template precursors if the abstracts are parsed and then structured as templates) may facilitate the contribution of new templates by users. This idea is discussed elsewhere in the present specification. See, for example, the discussion attending FIG. 21.

Figure 11:
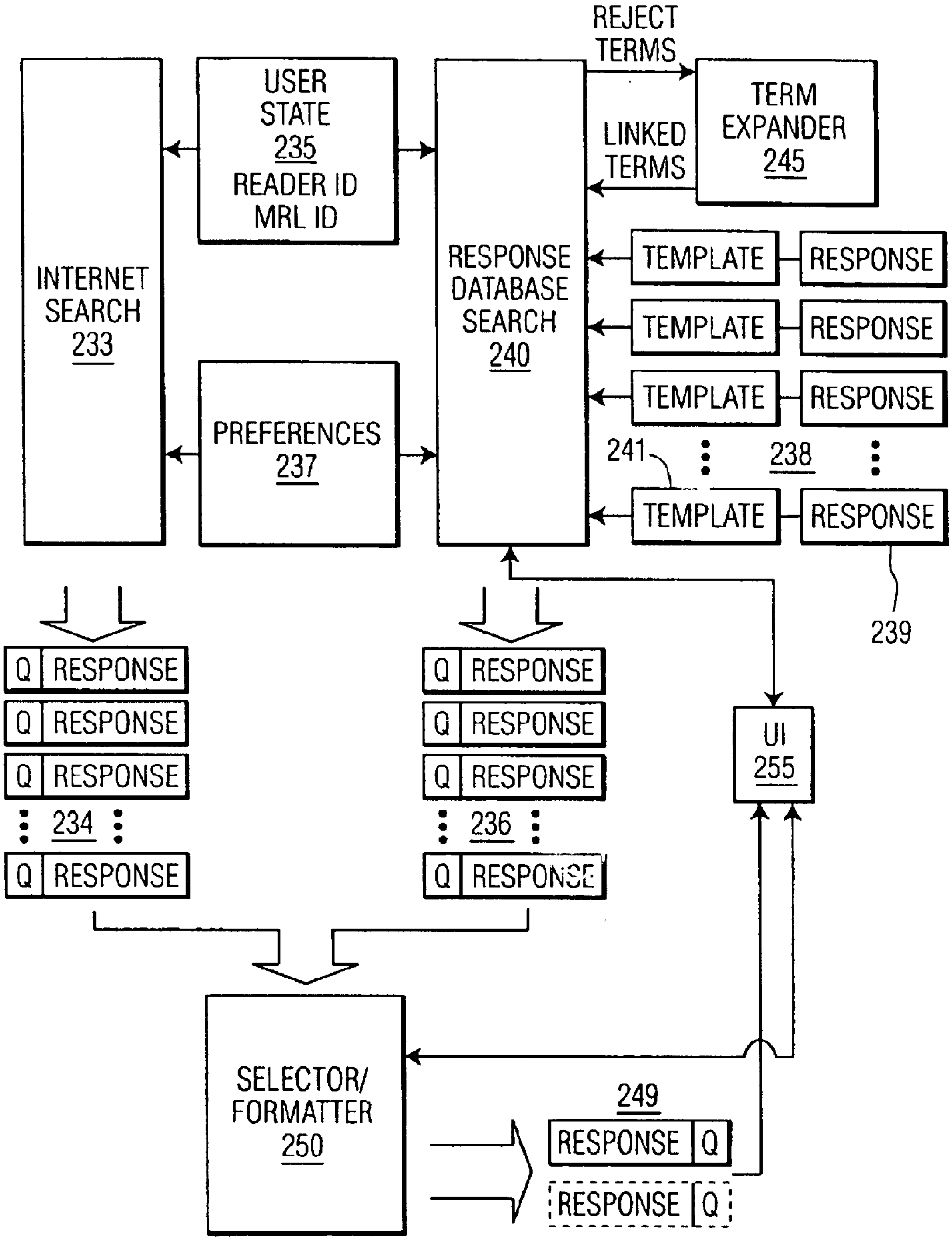
FIG. 11 is an illustration of a system by which a MRL reader may simultaneously perform a search of astructured resource base and a fuzzy search of an unstructured resource base to obtain results that may be combined for display by a UI according to another embodiment of the invention in which terms in a query are expanded conditionally.

Referring now to FIG. 11, in another embodiment, a user state 235 and context of use is derived from a scan event. The user state includes all available information from the reader, which may be a portable device with a personal information manager, cellular phone, GPS appliance with a mapping database storing the whereabouts of the user over time, etc. The reader (not illustrated in FIG. 11) may be networked to other devices so that the reader may actually be able to determine its location. For example, if a portable reader is able to join a piconet temporarily and ascertain that it was brought into a grocery store, the portable reader could retain an indicator of that event for use in determining the user's current state. Similarly, information about who the user has been in contact with may be available in a device either combined with the reader or connectable to the reader. All user state information that is relevant to a scan event is applied to an Internet search process 233. Permanent preference data may be stored in a preference data store 237 and selected portions of its data applied to the Internet search process 233 to refine it. The same data is selectively applied to a response database search 240. A response resource base 238 is different from sites on the Internet in that it is structured for servicing MRL readers. In the present embodiment, templates 241 of the response resource base 238 correspond to templates 460 in FIG. 10. These contain ordinary language terms that have been previously parsed by a NL parser and built into the templates corresponding to each record. The templates 241 may thus be ordered sets of data with fields that indicate key features of the responses 239. In other respects the resource base 238 is searched as discussed above.

Another feature of the present embodiment is that a dictionary, incorporated in a term expander process 245, is only applied to expand query terms when the response database search process 240 has determined that the confidence levels of the results are all poor. This preserves computational resources by not doing searches when direct use of the original search terms may produce a result with high confidence. The Internet search process 233 and the response database search process 240 both generate respective sets of responses 234 and 236, each with a corresponding confidence level. In the present embodiment, these are applied to a selector/formatter process 250 to generate a final selected set 249 which may be displayed by a UI element 255.

The templates 241 may be structured in any desired fashion to reduce the accuracy of matches to queries and increase the searching efficiency. Also, the embodiment of FIG. 11 may be modified to incorporate a term expander 245 in the Internet search process 233.

Preference data store 237, (as well as profile 430, FIG. 8, preference database 611, FIG. 7, and similar components in other figures) may contain data obtained by various means. A first type of device for building a preference database is a passive one from the standpoint of the user. The user merely makes choices (e.g., menu choice in a browser built into a reader) in the normal fashion and the system gradually builds a personal preference database by extracting a model of the user's behavior from the choices. It then uses the model to make predictions about what the user would prefer to watch in the future or draws inferences to classify the user (e.g., a baseball enthusiast or an opera lover). This extraction process can follow simple algorithms, such as identifying apparent favorites by detecting repeated requests for the same item, or it can be a sophisticated machine-learning process such as a decision-tree technique with a large number of inputs (degrees of freedom). Such models, generally speaking, look for patterns in the user's interaction behavior (i.e., interaction with a UI for making selections).

One straightforward and fairly robust technique for extracting useful information from the user's pattern of behavior is to generate a table of feature-value counts. An example of a feature is the "time of day" and a corresponding value could be "morning." When a choice is made, the count of the feature-values characterizing that choice are incremented. Usually, a given choice will have many feature-values. A set of negative choices may also be generated by selecting a subset of shows at the same time from which the choice was discriminated. Their respective feature-value counts will be decremented. This data is sent to a Bayesian predictor which uses the counts as weights to feature-counts characterizing candidates to predict the probability that a candidate will be preferred by a user. This type of profiling mechanism is described in U.S. patent application Ser. No. 09/498,271, filed Feb. 4, 2000 for BAYESIAN TV SHOW RECOMMENDER. A rule-based recommender in this same class of systems that build profiles passively from observations of user behavior is also described in the PCT application, WO 99/01984 published Jan. 14. 1999 for INTELLIGENT ELECTRONIC PROGRAM GUIDE.

A second type of device is more active. It permits the user to specify likes or dislikes by grading features. These can be scoring feature-value pairs (a weight for the feature plus a value; e.g., weight=importance of feature and value the preferred or disfavored value) or some other rule-specification. For example, the user can indicate, through a UI, that the user prefers dramas and action movies, and that s/he does not like cooking. These criteria can then be applied to predict which from among a set of alternatives would be useful to the user.

As an example of the second type of system, one EP application (EP 0854645A2) describes a system that enables a user to enter generic preferences such as a preferred program category, for example, sitcom, dramatic series, old movies, etc. The application also describes preference templates in which preference profiles can be selected, for example, one for children aged 10–12, another for teenage girls, another for airplane hobbyists, etc.

A third type of system allows users to rank resources in some fashion. For example, currently, a digital video recorder called TIVO® permits users to give a program up to three thumbs up or up to three thumbs down. This information is similar in some ways to the first type of system, except that it permits a finer degree of resolution to the weighting given to the feature-value pairs that can be achieved and the expression of user taste in this context is more explicit. So, for example, a UI used in the present invention may have an OK button to acknowledge and close a current dialog box or display element. Alongside the OK button, the UI could show a NOT OK button to allow the user to close the dialog, but indicate that the response was not useful.

A PCT application (WO 97/4924 entitled System and Method for Using Television Schedule Information) is an example of the third type. It describes a system in which a user can navigate through an electronic program guide displayed in the common grid fashion and select various programs. At each point, he may be doing any of various described tasks, including, selecting a program for recording or viewing, scheduling a reminder to watch a program, and selecting a program to designate as a favorite. Designating a program as a favorite is for the purpose, presumably, to implement a fixed rule such as: "Always display the option of watching this show" or to implement a recurring reminder. The purpose of designating favorites is not clearly described in the application. However, more importantly, for purposes of creating a preference database, when the user selects a program to designate as a favorite, she/he may be provided with the option of indicating the reason it is a favorite. The reason is indicated in the same fashion as other explicit criteria: by defining generic preferences. The only difference between this type of entry and that of other systems that rely on explicit criteria, is that when the criteria are entered. The present system may build profile data using any of the techniques described above.

Profile data may be used to modify queries as discussed above. However, under certain circumstances, the profile data may include a stored correlation between a type of scan event and a resource to be used. For example, a user might define a response for programming a microwave oven to thaw ice cream. The use of the profile and the search for responses should give a high weight to resources created by the user for use in clearly defined circumstances. Thus, the profile may contain its own list of resources and templates that are used to match a query in preference to a search of an external resource base.

Figure 12:
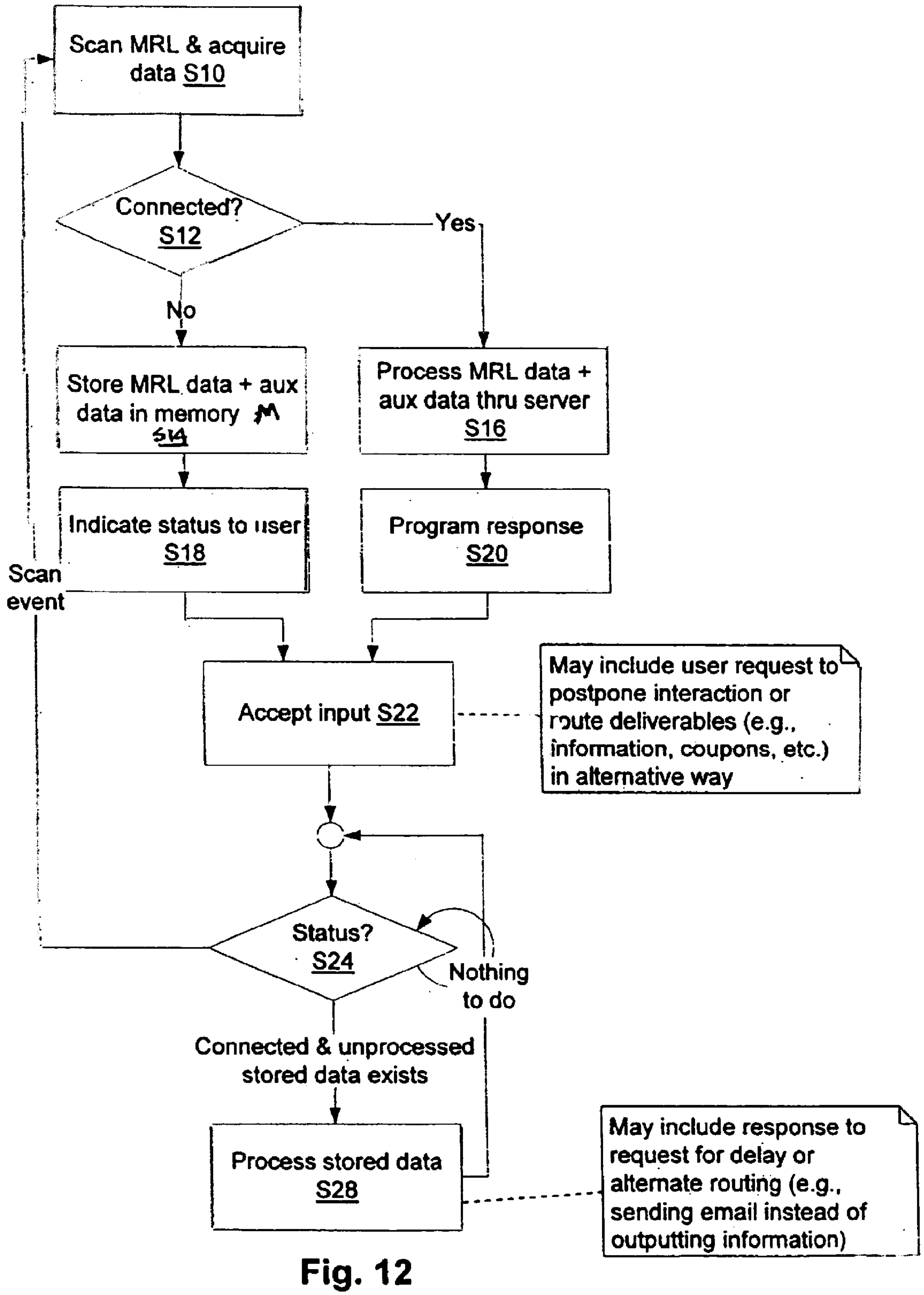
FIG. 12 is a flow diagram of a process for initiating a delayed interaction with a server according to an embodiment of the invention.

Referring to FIG. 12, a modification of the process of FIG. 6A allows a user to receive information through a fixed 120 or portable reader 100 and, in case the user chooses not to receive a response at that time or the portable reader 100 is unable to connect to the server 140, the response is delayed and continued later. Assume the user scans the MRL device T causing the reader 100/120 to acquire data from the MRL device T in step S10. In step S12, the reader 100/120 determines if it is able to connect with the network/Internet 130. If the reader 100/120 is connected, the interaction may be initiated between the reader 100/120 and the LAN server 150 or Network server 140 beginning with the transmission of data to the network server 140 at step S16. For example, the data transmitted may include data from the MRL device T plus other information, the other information including, for example, the identity of the user and/or certain profile data characterizing the user. Included with the information from the MRL device T may be a network address to which the reader 100/120 may connect to complete the information exchange. The interaction is continued as defined by the interaction process running on the server 110 at step S20. The data exchanged in the interaction may include data responsive to the acquired data, further user input, and/or data stored on the network server 140. Generally, it is contemplated that the interaction would be conducted in accord with, and by means of, a client-server process, for example using HDML (handheld device markup language), a markup language for small wireless devices or HTML (hypertext markup language).

When, in step S12, it is determined that the reader 100/120 cannot link to the server 140/150, the reader 100/120 may store the acquired data in its memory M at step S14. Optionally, at step S18, the reader 100 may indicate the fact that the data may be stored locally and request acknowledgement in step S22. The acknowledgement may include giving the user the option of erasing the data stored in step S20.

In step S24, the status of the reader 100 may be ascertained. If it is connected and contains unprocessed stored data, having come through steps S14, S18, and S22, control passes to step S28 where the interaction or other interaction process that did not occur previously is initiated. Among the data transmitted in step S50 to the network server 140/150 may be the time since the HMDR device T was scanned. From this, the interaction process may determine whether it makes sense to direct the user to a sale within the store (if it has been only a short time since the scan). Again the interaction process may provide for alternate routing of information. For example, the user could request that relevant messages, coupons, etc. be sent by email, if possible.

The process of FIG. 12 provides for a stationary loop process when the reader 100/120 has nothing to do as indicated at step S24 and to return to step S10 when a scan is initiated.

Figure 13:
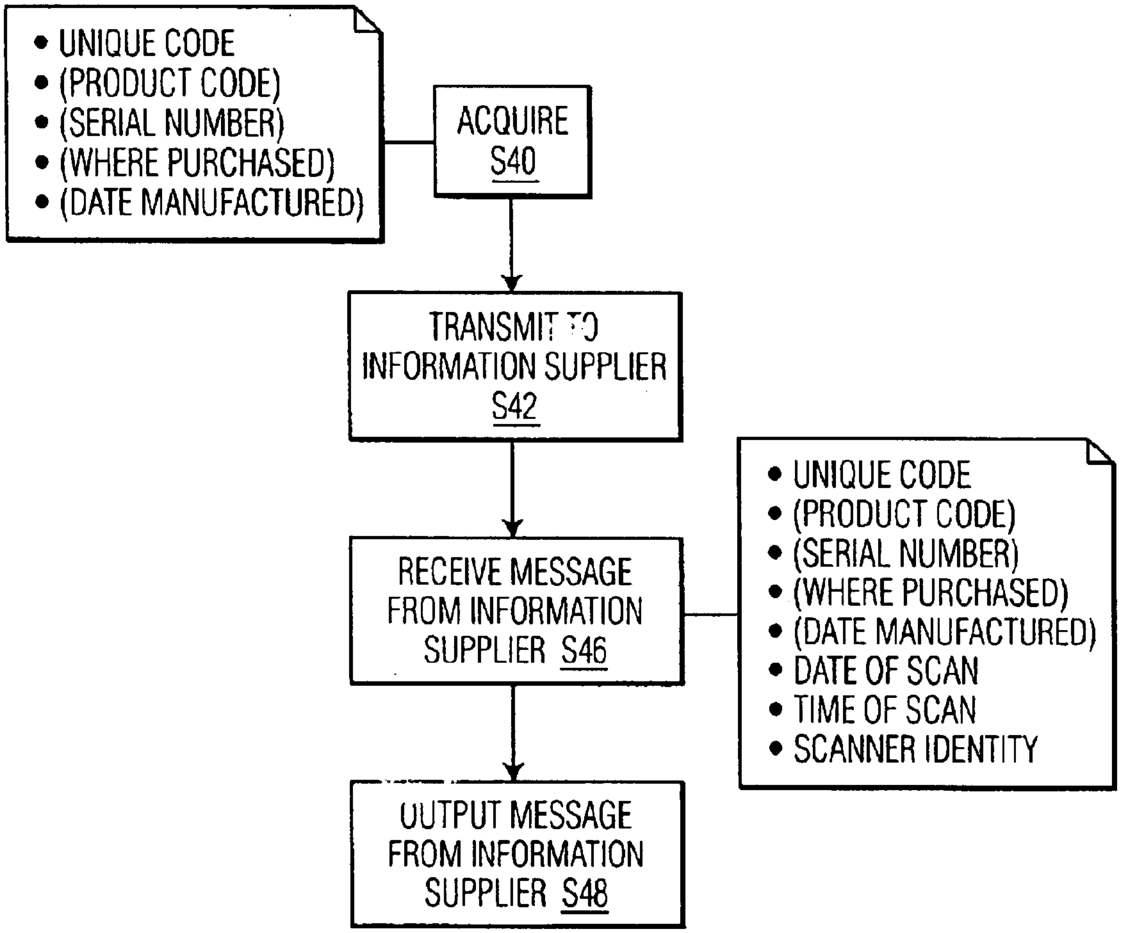
FIG. 13 is a sequence diagram illustrating an example interaction between a server and a scanner terminal in which the scanner and server complete a transaction including transfer of information to the terminal.

Referring now to FIG. 13, in an example sequence that may occur according to the process of FIG. 12, the reader 100/120 acquires data from the MRL device T at step S40 and transmits it to an information supplier who has programmed the network server 140 at step S42. A message is generated by a software process (interaction process) running on the network server 140 which results in the reception of a message by the reader 100/120 at S46. The message is then output by the reader 100/120 at S48.

The data acquired by the reader 100/120 may include simply a unique identifier of the device or it could contain standardized symbols indicating product code, serial number, retailer to which the product was shipped, etc. The latter data, as indicated by brackets, however, may be derived from a unique identifier if the latter are correlated in a database of the information supplier. The data sent to the information supplier may include the date of scan, the time of scan, the scanner's (or person's) identity, and other information not derived from the MRL device T but available. The scanner identity may be unique or a code for a profile classification or may point to a particular profile without identifying the scanner explicitly. Again, the profile data could also be sent by the reader 100/120.

Figure 14:
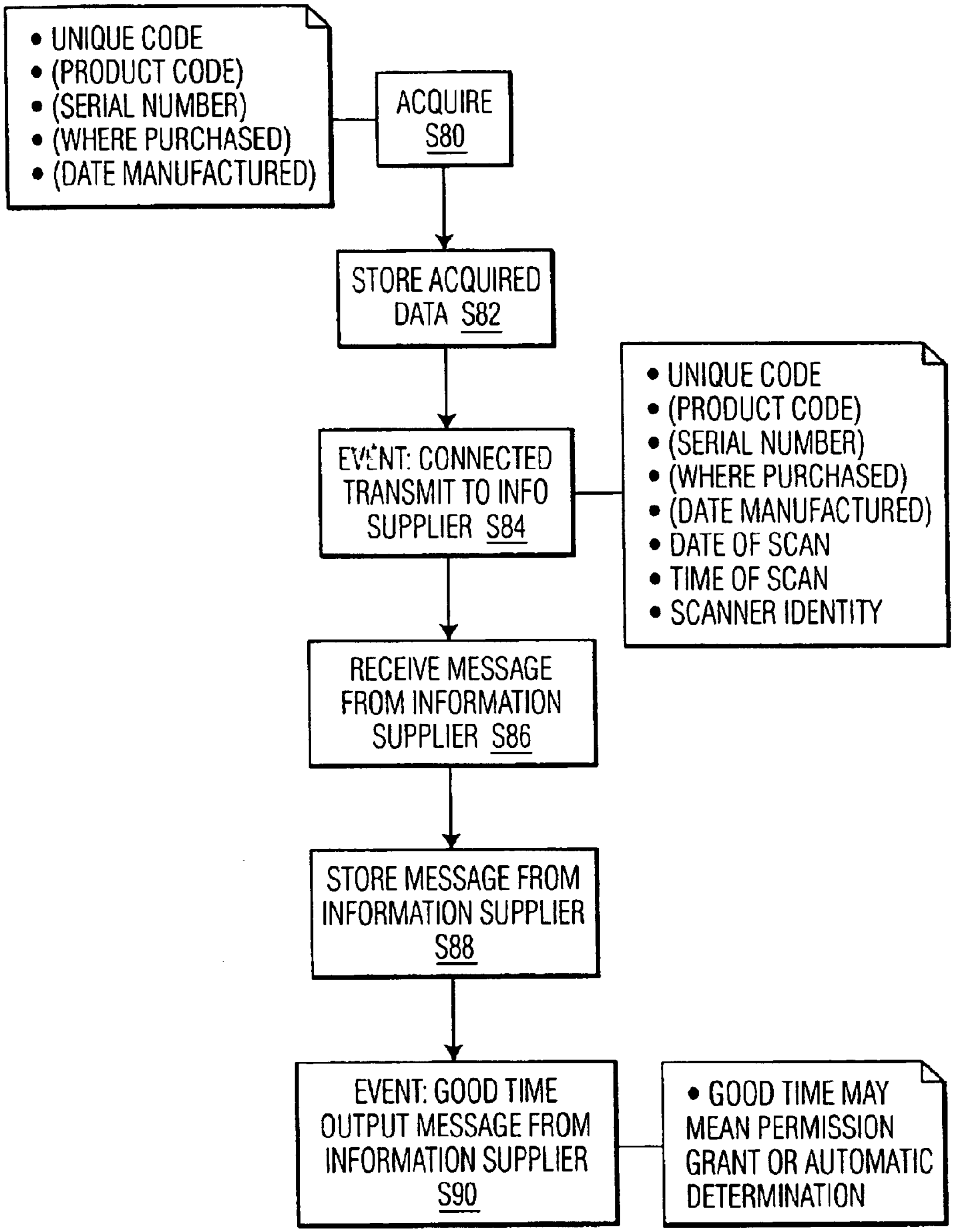
FIG. 14 is a sequence diagram illustrating an example interaction between a server and a scanner terminal in which the scanner and server do not complete the transaction but delay the transfer of information to the terminal to a later time.

Referring now to FIG. 14, in another example sequence, data is acquired at S80 and stored at S82. At a later time, the reader 100/120 becomes connected and, in response to this event, transmits the data acquired at S80 to an information supplier at S84. The information supplier then sends a responsive message to the reader 100/120 at S86. The reader 100/120 then stores the responsive message at S88. Later, at the occurrence of some event that corresponds to a good time for output, the good time event being determined by some process such as a direct request by a user indicated at the reader 100/120, the stored message is output at S90. The reader may be programmed to output the message automatically when the reader 100/120 is able to establish connection (i.e., the reader 100/120 determining that it is connected).

Figure 15:
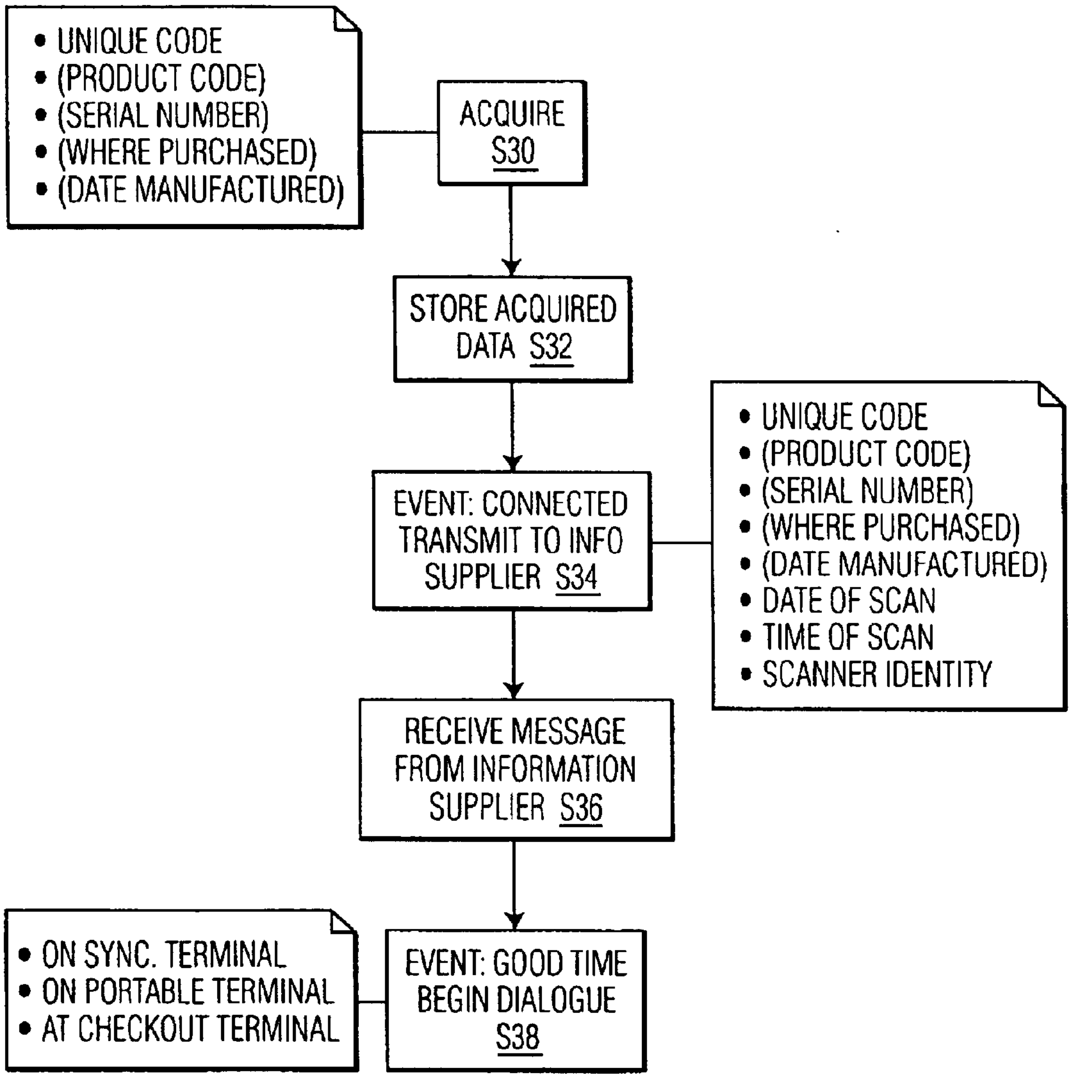
FIG. 15 is a sequence diagram illustrating an example interaction between a server and a scanner terminal in which the scanner and server complete a transaction including transfer of information to the terminal at time after the scanning took place.

Referring now to FIG. 15, yet another sequence begins with the acquisition of MRL device T data at S30. The data is stored at S32. At some later time when the reader 100/120 is connected, the stored data is sent to the information supplier at S34. The information supplier sends a message which is received at S36 and sent to the reader 100/120. At some time later upon an event indicating it is a good time for the delayed interaction, the message is output to invite the user to begin interacting with the information supplier at step S38. The message may be a simple invitation or may indicate some feedback based on the data sent at S34, such as a menu of options defined at the beginning of the interaction process.

Figure 16:
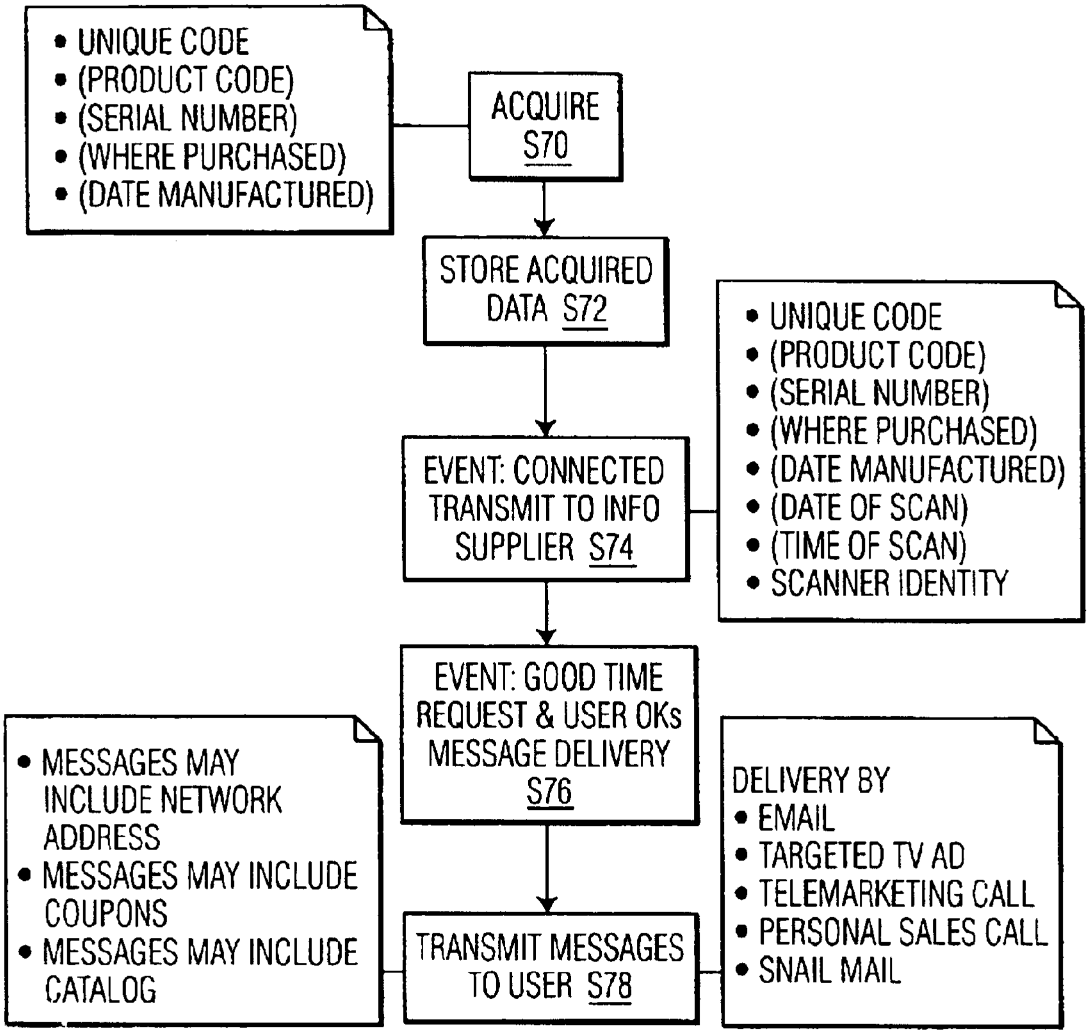
FIG. 16 is a sequence diagram illustrating an example interaction between a server and a scanner terminal in which the scanner and server complete a transaction including transfer of information where the information is routed in a manner other than directly to the terminal.

Referring to FIG. 16, yet another sequence begins with the acquisition of MRL device T data at S70. The data is stored at S72 on the reader 100/120. Then, when the reader 100/120 is connected, the reader 100/120 connects to the network server 140 and transmits the stored data at S74. At S76, the user is prompted to accept a message from the network server 140, and upon acceptance, the message is delivered at S78 concurrently or at a later time. Several illustrative examples follow.

The dialog may take place at a later session in response to an email as follows. The user indicates at S76 that he/she wants to participate in the interaction at a later time to be initiated by the user by selecting an HTML link in an email message. (obviously, the invitation need not be so complicated, for example, the user may be presented at 40 with a selection labeled: "Send email alert to learn about <product> later.")

The dialog may take place later through a targeted TV advertisement or interactive TV session as follows. (For purposes of the present discussion, these may be essentially the same as a terminal connected to the Internet, a television and set-top box being essentially its equivalent.) The user selects an option for TV delivery and the interaction is scheduled to take place at time when the user's TV is active (or at some time selected by the user). Other alternatives corresponding to S78 include the user indicating a desire for a telephone or personal sales call, or regular postal delivery of information.

Figure 17:
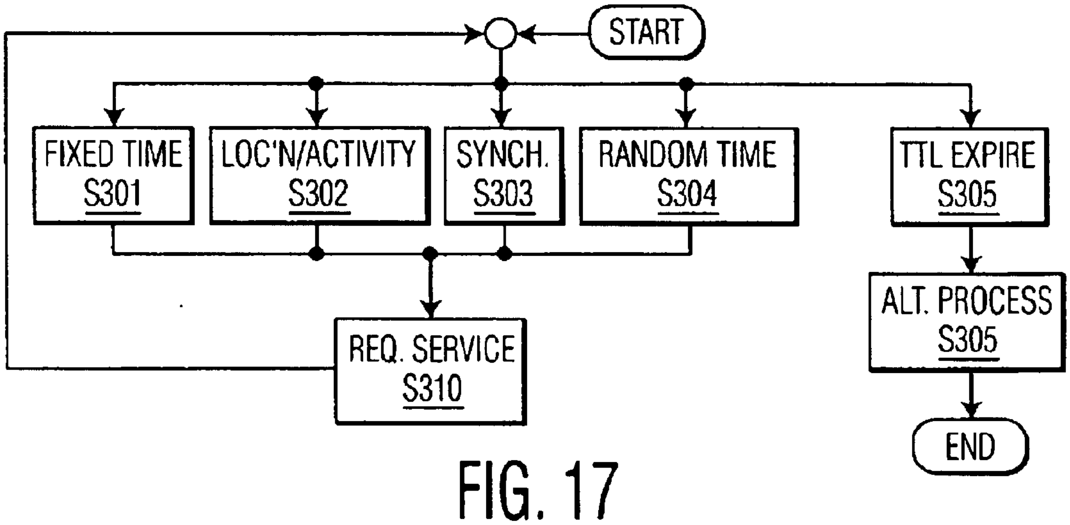
FIG. 17 is a flow diagram illustrating a procedure that waits for an event indicating that it is a good time to complete a delayed transaction or an event indicating that a potential transaction should be deleted or rerouted according to an embodiment of the invention.

Note that the process at S78 may occur on the portable terminal, on a stationary appliance, such as one located at a retail premise, or on any other device. Referring to FIG. 17, the determination of a good time for beginning or continuing a delayed interaction, information delivery, or transaction may be determined by a fixed time delay S301, an event indicating the user is at a particular location or involved in a predetermined activity S302, the synchronization of a portable reader with a stationary terminal S303, or simply a random time S304. When any of these events S301, S302, S303, S304 occurs, a request for service is initiated at step S310 and the interaction process is continued or begun. For example, the user may access an Internet portal and receive the message in response to logging in or the user's cookie correlated with the identity data transmitted at S74. Stored data corresponding to a delayed interaction may be given an expiration time and date and caused to expire after the passage of that time S305. In that case, an alternative process can be performed S305 such as giving the user the option of delaying the interaction further, emailing a message, etc. The data and the incipient interaction may be purged by either the reader 100/120 or the network server 140.

Whereas in the above embodiments, the invention was described in terms of information exchange, it is contemplated that these exchanges could trigger actions as well. For example, one result of the interaction process could be the online purchase of a product. Also, the interaction need not occur on the reader 100/120 that sent the data. The interaction may take place through a connection to the information supplier provided by a different appliance such as one of the appliances 170-190. One way to initiate the interaction through the alternate appliances is by scanning the MRL device T with a scanner of the appliance. Another may be by synchronizing the reader 100 with the appliance where, for example, the message received at 34 is conveyed to the appliance along with other data required to complete the interaction, if necessary according to the interaction process.

Figure 18:
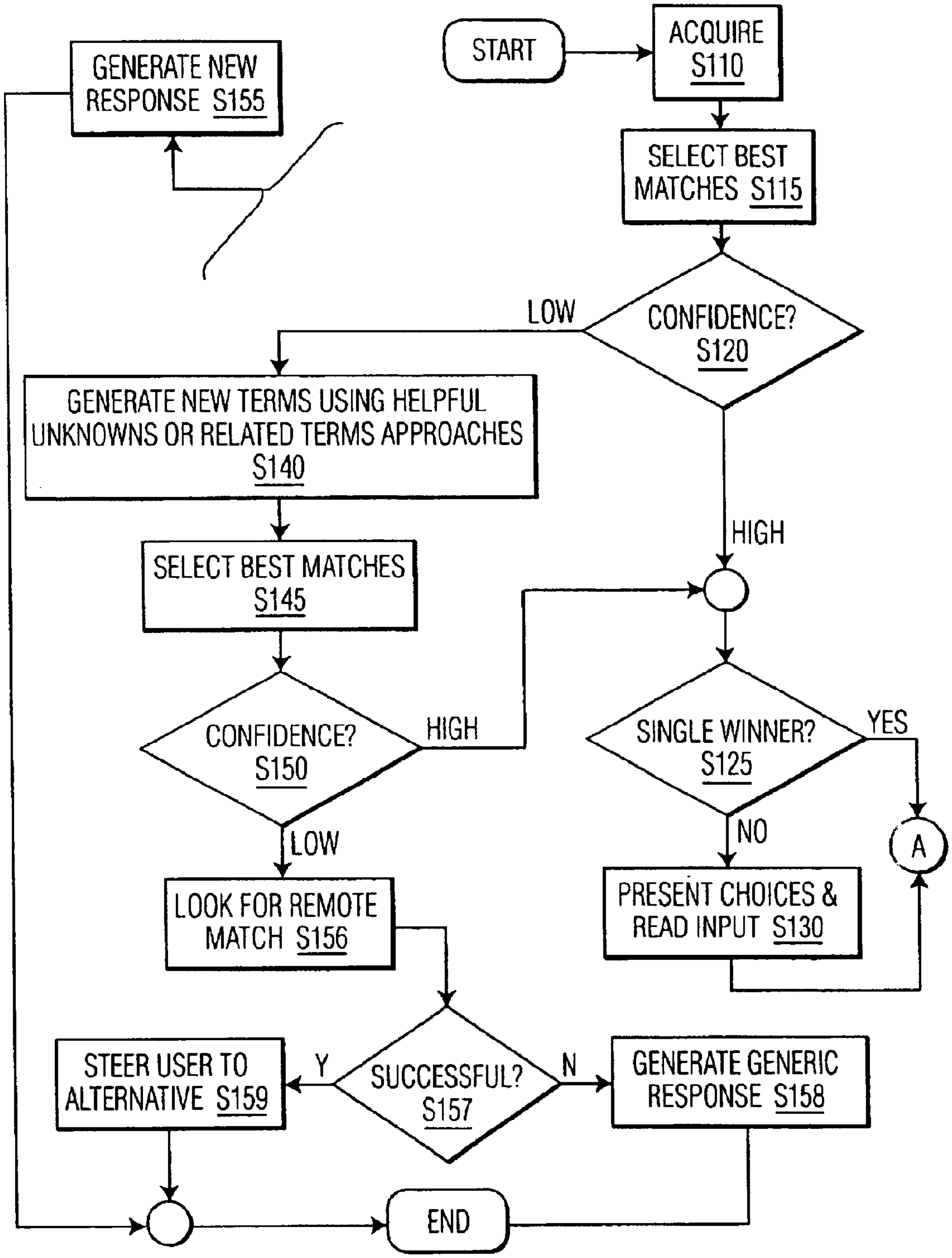
FIGS. 18 and 19 show a linked flow chart showing a procedure for providing various options for various outcomes of a search based on a scan of a MRL according to an embodiment of the invention.

Referring to FIG. 18, putting a few of the above features into an embodiment, scan and other data is acquired in step S110. The best matches in one or more resource bases are determined in step S115. Then, it is determined in step S120 whether the confidence level of one or more results is high. If none of the results has a high confidence level, in step S140, new terms are generated using an appropriate technique, such as a related terms dictionary as described above or by disambiguating the search query by seeking new information from the user. In this case, the discriminant identification in the search results, discussed below in connection with FIG. 24, may be used to obtain additional feedback from the user. Then a new search is done in step S145 and the results checked for high confidence in step S150 as in step S120. If the results show no high confidence results once again, a search for a high confidence match is done by replacing terms in the query with other terms that are not necessarily related to the replaced term. This may be described as a hunt for a remote match S156. For example, if the cereal were scanned with a table saw, the "table saw" term might be replaced with a number of alternatives more closely related to other search terms such as "cereal" even though the replacement terms may be remote from the original term. Such terms might produce a high confidence response, such as cupboard would produce in combination with cereal. The search with one or more replacement terms, if successful S157, causes the reader to steer the user to the article identified by the replacement term in step S159. If the search is unsuccessful, a generic response S158 may be generated. At all or any points in the procedure flow of FIG. 18, the user may be given the option to opt out of the search for a response to permit the user to create a new response and response template for future use in step S155. For example, in step S155, the user could program a microwave to heat something for which the reader system did not have a particular response in its resource base. Note that the above procedure may also be modified so that a generic response S158 is output along with a message suggesting a different device as in step S159 or to allow the user the opportunity to go from step S159 to step S158 if the user desires, by generating appropriate UI controls.

If in either of steps S120 and S150, the confidence level of one or more results is determined to be high, the system determines, in step S125, if there is a single response with a high confidence level, or more than one. If there is more than one, then the choices are presented to the user in step S130 and the control flow passes to step S160 of FIG. 19. If there is only one choice, then control flow passes directly to step S160 of FIG. 19.

In step S160, the user's preference with regard to how a single dominant result should be handled is determined. Some users may prefer to have a system automatically take action, for example to program the microwave oven, to save time. Other users, being less concerned about efficiency, may prefer to control the process all the time. Users may change this option, depending on where they are. For example, if the user is shopping, the user may not want information delivered immediately, but prefer to be given the option of routing, for example by email or some other means, for later review or handling. If, on querying a user profile data store, it is determined that the direct response is preferred, an appropriate action defined by the resource is implemented in step S145. This may be simply the immediate delivery of information to a reader display.

Figure 19:
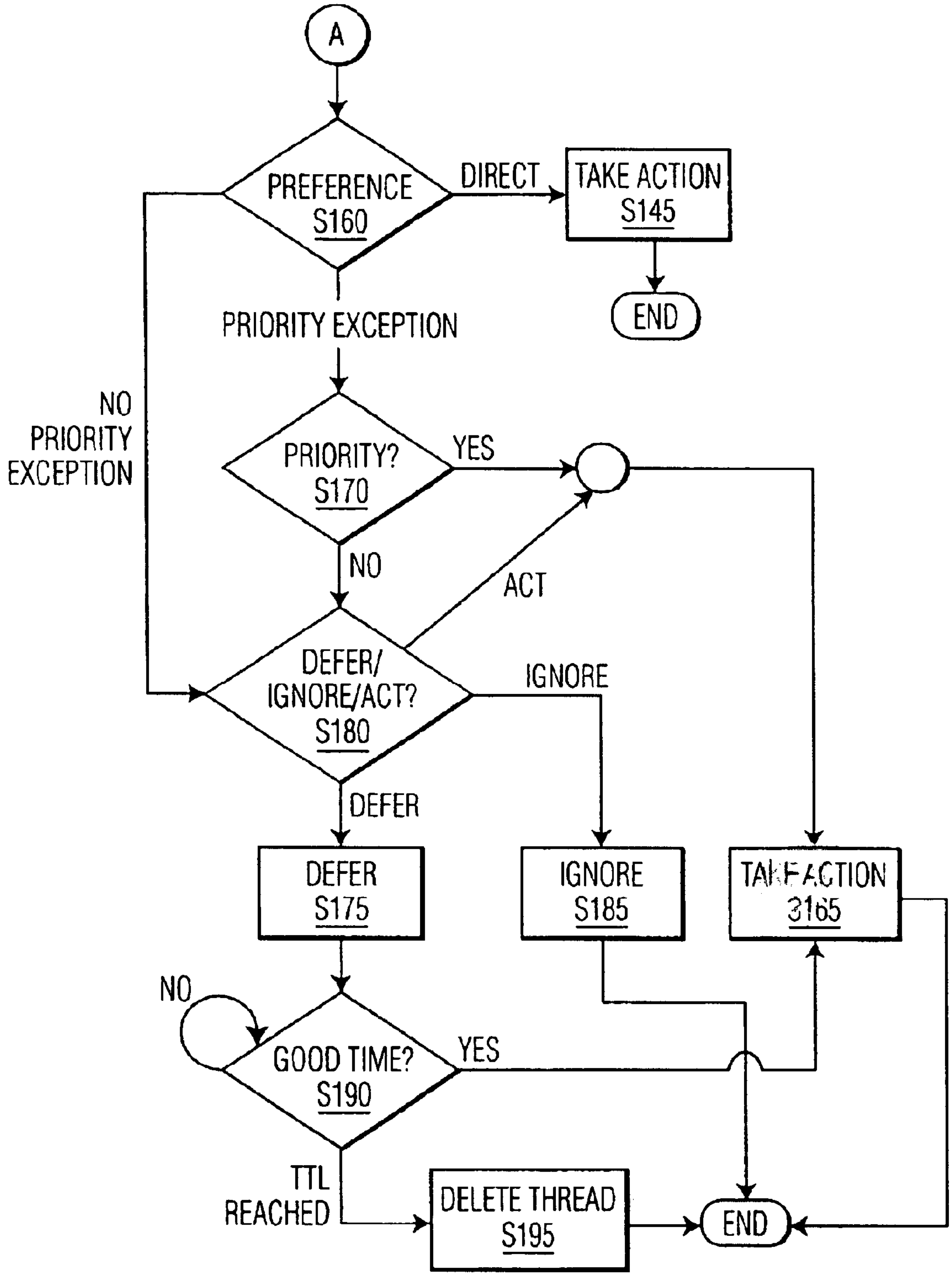

Two other possibilities for handling resources are defined in the embodiment of FIG. 19 and dictated by the user's preference (or possibly some other means, such as the type of reader, the time of day, the location of the reader, the type of resource being delivered, etc.). One is that some resources, because they satisfy a priority exception list, should be directly implemented. For example, the user may be keenly interested in certain results, such as a health related warning or news item or weather warning. In such cases, the user may want the resource to be delivered or implemented. In step S170, this kind of exception is implemented. If the resource corresponds to a high priority resource or other type of exception, the resource is delivered or implemented in step S165. Otherwise, in step S180, the user is given an option of deferring, ignoring, or delivering or implementing the resource retrieved. This last step S180 involves getting input from the user. If the user chooses to ignore the resource S185, the process terminates. If the user chooses to deliver or implement the resource, the action is taken in step S165. If the user chooses to defer the delivery or implementation of the resource S175, the offline procedure of previous embodiments may be implemented causing a delay for the arrival of a good time S190 until either the action is completed S165 or some event such as the expiration of the time to live timer, whereupon the resource retrieval and delivery process thread is terminated S195.

Figure 20:
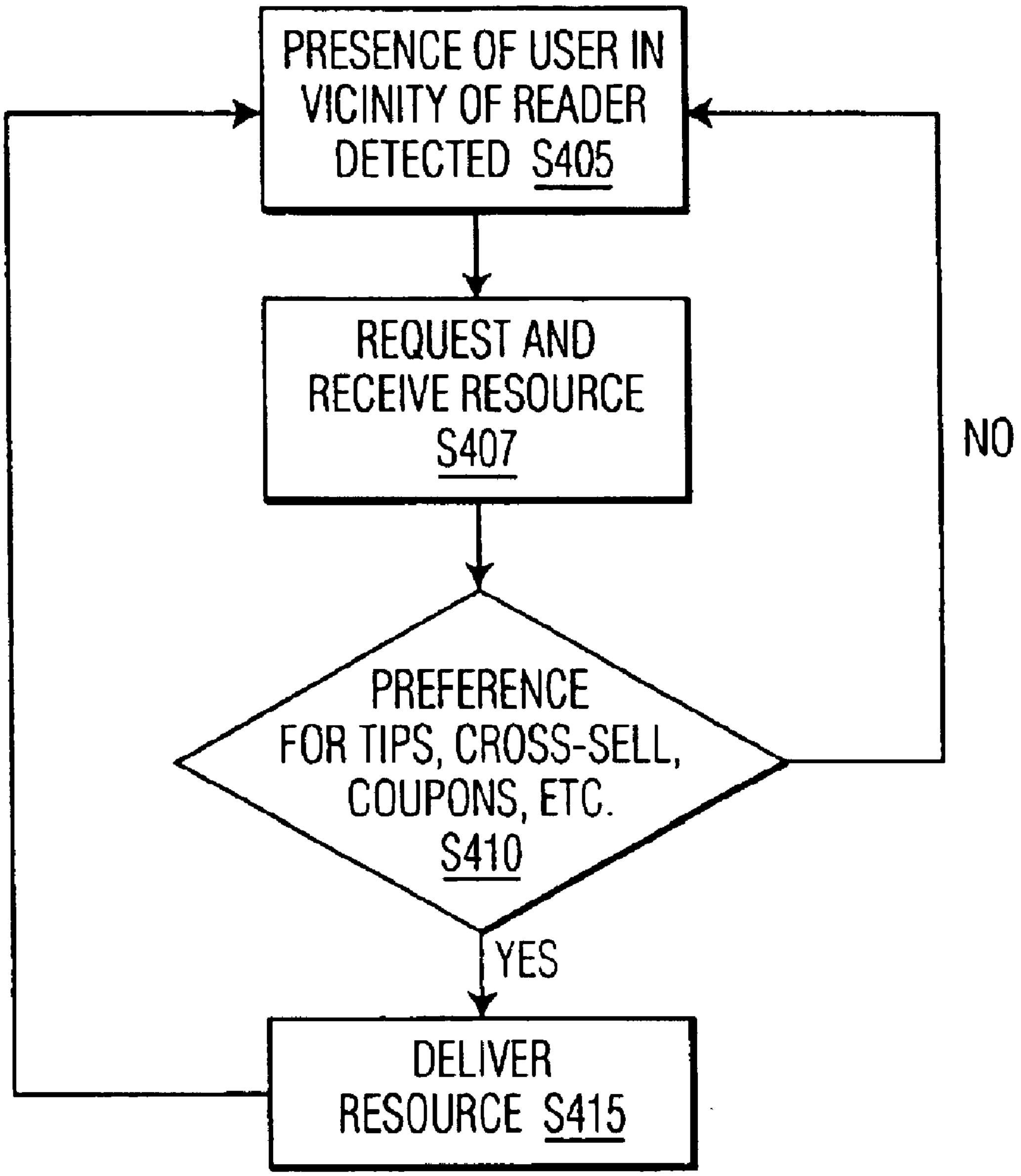
FIG. 20 is a flow chart indicating a procedure for passively scanning MRLs and receiving messages conditionally according to an embodiment of the invention.

Referring to FIG. 20, a process for generating messages on the UI of a reader in the absence of a scanning event begins with detection of the presence of a user in step S405. Alternatively, the loop of FIG. 20 can be run continuously or on an intermittent schedule or scheduled in some other way. In step S407, a resource is automatically requested by the reader and a response received. The request may be generated from user preference data. In step S410, the resource received is compared to the user preference data and rejected, in which case control passes to step S405 or accepted in whole or in part, in which case it is delivered in step S415 and control returns to step S405. Note that delivery of the resource may involve the initiation of the interaction or some automatic process or simply the delivery of information, like an advertisement.

Figure 21:
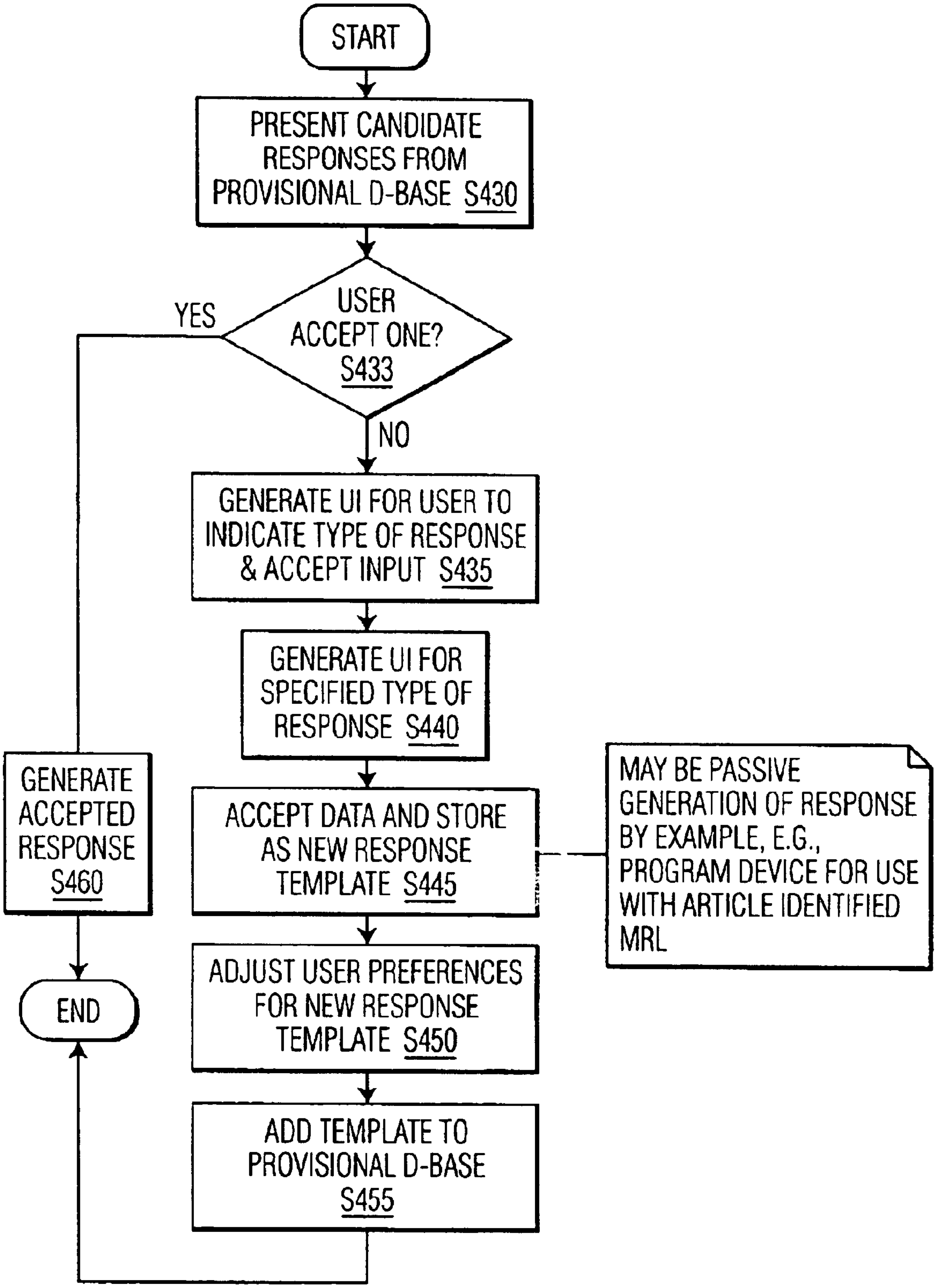
FIG. 21 is a flow chart indicating a procedure for allowing a user to define a new response for use with a device and article identified by a MRL device according to an embodiment of the invention.

Referring to FIG. 21, a procedure by which new resources and templates may be generated begins in step S430 with the presentation of one or more candidate resources for the user to select. For example, if the user scans an ice cream MRL device with a microwave oven reader, the server might come up with irrelevant (to the user) responses or none at all. For example, see step S156 in FIG. 18. Then the present procedure might be invoked to give the user an opportunity to define programming instructions for the microwave oven. For example, the user may define instructions for defrosting the ice cream (e.g., 50% power level and 60 seconds time). The next time the user uses the microwave oven reader to scan an ice cream MRL device, the server could respond immediately with instructions for programming the microwave oven. In addition, the server could make the instructions entered by one user available to other users, either optionally or automatically. In step S433 the user either accepts one of the alternatives, in which case the accepted resource is implemented and stored as a preferred resource for the given circumstances S460, or rejects them all. Here the user is giving feedback that may be used to augment the profile data as discussed above. In step S435 a UI is generated to permit the user to indicate a type of resource and accept input defining it. In step S440, a UI is generated to permit the user to specify any required details or parameters for the resource. For example, if the resource is a microwave oven program, the user could specify time, power level, etc. In step S445, the entered data is stored as a new resource and template. In step S450, the profile data store is updated with the new resource and template.

In step S455, the resource and template are stored in an external provisional resource base to permit other users to use it. The provisional resource base may be handled differently from a standard one to avoid deliberate or accidental contamination of a widely used resource base with useless or dangerous resources. Thus, a separate resource base may be made available for provisional resources and responses to the resources gathered by designated subscribers (as indicated in the user preference profile) before an administrator determines what to do with them.

Figure 22:
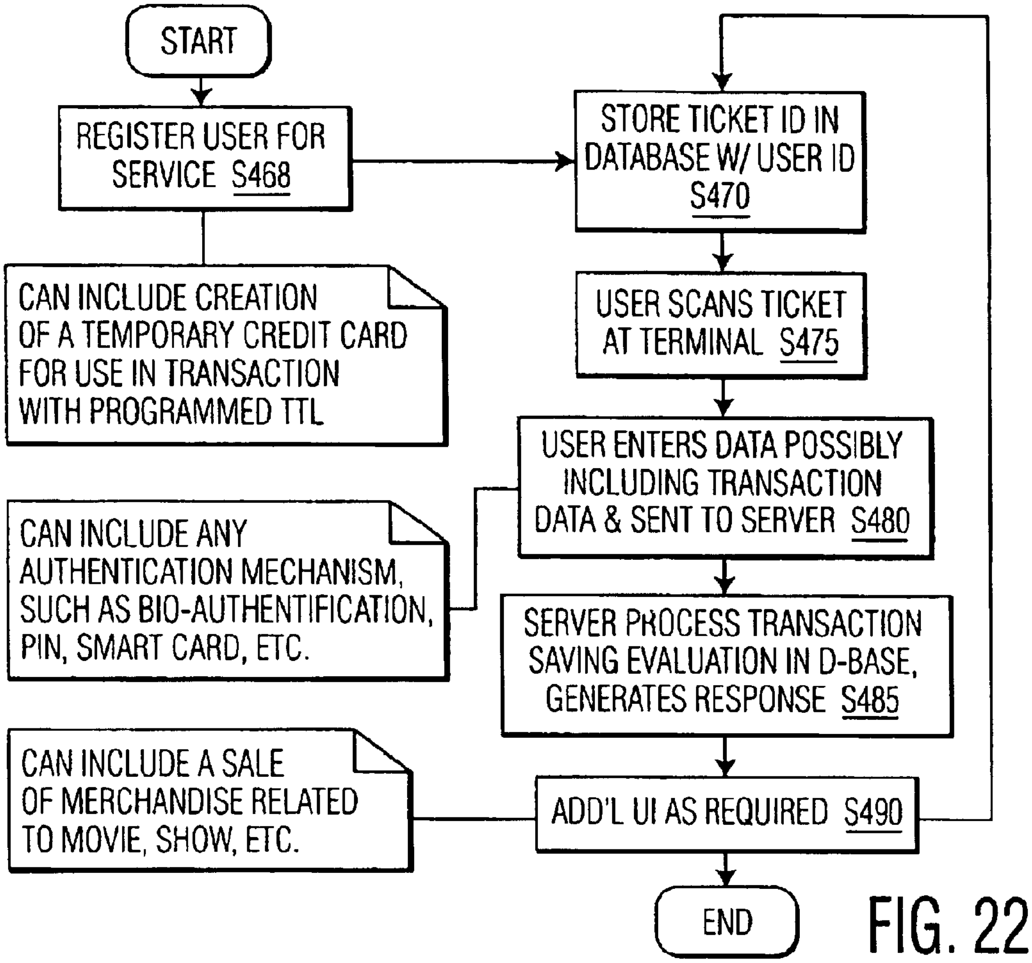
FIG. 22 is flow chart indicating a procedure for creating an association between an account and a MRL on a ticket or other document to permit a user to purchase with the ticket or allow a youth a limited ability to make purchases and to store preferences and restrictions in a database according to an embodiment of the invention.

Referring to FIG. 22, a procedure for providing various features using a ticket stub, coupon, receipt, or other paper document having a MRL device attached. As mentioned with reference to FIGS. 3 and 4, a ticket stub or other document may have a MRL device affixed to it. These documents or coupons may provide a valuable marketing device, for example. A user seeing a movie may scan his/her ticket stub at a kiosk located at the movie theater and rate the movie s/he just saw, purchase goods related to the movie, and do other things. While it has been proposed that barcodes be used on a ticket stub to connect users to web sites for purchase of goods, this degree of automation merely avoids the need for the user to enter a web address. The present idea is to make the purchase or entry of information into a preference database very easy and quick. There is a much greater likelihood of a sale when a user is provided an opportunity to buy a movie soundtrack just as the user leaves the movie with the music still fresh in his/her mind. The smaller the number of steps involved, the more likely a sale will be completed. In an embodiment of the invention, a MRL device is attached to a ticket stub. The device may contain a resource address at which the movie soundtrack can be purchased. Moreover, the device contains sufficient data density to correlate or store account, authorization, shipping, and authentication information to allow the purchase to be completed without any prompting from the user aside from the selection and confirmation of an item to be purchased. If a theatergoer purchases tickets using a credit card, the account can be linked temporarily to data on the MRL device on the ticket stub. This data can further link an order process to preference information contained in the user-profile database and the purchase used to augment that database. To protect the user's account, the connection between the user's credit account and the ticket data may be given a predefined expiration period, say 2 hours after the movie or other event is over. As an inducement for the user to purchase at the theater, the user can be given a discount incentive such as lower price on his/her next ticket purchase, discounted price for the goods ordered, or a free gift. Precisely the same functionality can be provided through a home computer connected to the Internet or a portable terminal rather than a kiosk terminal.

The procedure begins with a registration step S468 in which a user may obtain the document having the MRL device. The registration process may include obtaining account, authorization, and/or authentication information from the user, an external source such as an e-wallet, ATM network or subscriber network, or other resource. An identifier in the MRL attached to the document is then associated with the account and the necessary data for completing a transaction in step S470. Note that in steps S468 and S470, the account may not involve money or credit at all, but may merely be an account for storing personal information such as preferences regarding a subject, such as movies. For example, a user could subscribe to a service, offered by an entertainment service, which allowed a user to open a private account for storing his/her preferences and using these preferences for various services in return for the user's authorization to use the data for marketing purposes. For example, the user could rank movies as the user leaves them. Later, after ranking multiple movies, the user could receive recommendations by email. The user's preferences could be combined with those of friends to generate recommendations for parties of two or more friends to see together.

In step S475, the user scans his document at a terminal, for example a kiosk at an entertainment venue. In step S480, the user is prompted for input, such as a selection of a product for purchase, an evaluation of an event just enjoyed, etc. The user's authorization information is processed by a server in step S485 and a response generated which may include the invitation for additional requests, confirmation of sale, etc. Further transactions may be invoked and appropriate UI elements generated in step S40. In step S480, preferably an authentication step is involved to insure that a lost document is not used by a finder. The association in step S470 may be given a time to live (TTL) so that after the expiration of some predefined interval of time, the document and MRL device can no longer be used. By forming an association between the user's account and the MRL device's unique code, purchases and other authorization-requiring transactions can be completed quickly. The registration process in step S468 is analogous to the creation of a temporary credit card in the MRL device. As mentioned, however, it is preferable under most circumstances to attach an authentication requirement such as biometric or entry of a personal identification number (PIN) or symbol.

The registration process that associates an account with a ticket MRL may be done at a residence before going to the entertainment venue over the Internet. Currently, there are proposals for systems in which a user can purchase a ticket and print it, with a bar-code, on a printer at home. The ticket is then scanned at the theater to authorize the user. This same thing could be done with a MRL device. The user stores an association between an account and a MRL ("blanks" may be distributed free or for a nominal fee) by scanning the MRL at home and performing a secure transaction. The association with the account that permits the ticket to be used for purchases may impose a spending limit. A parent could prepare and give a ticket to a child that permits the child to attend the movie and make limited purchases. For example, the child could buy a recording or treats at the theater using the MRL as a temporary expense-limited charge device.

Figure 23:
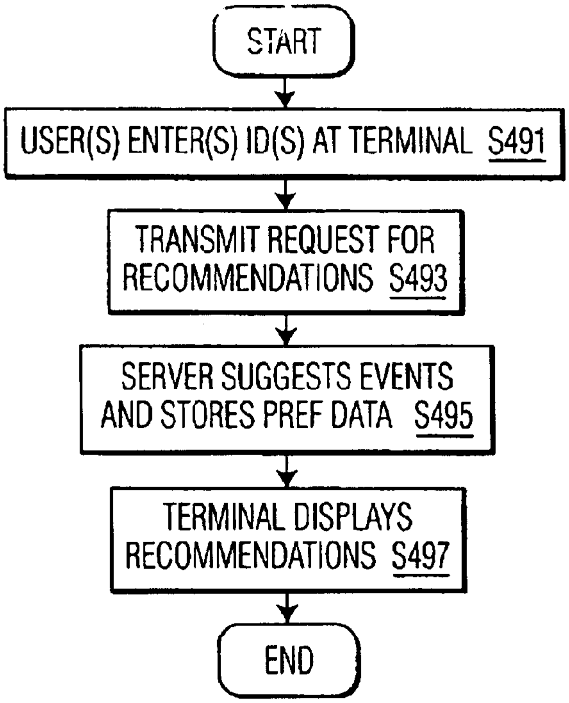
FIG. 23 illustrates a simple process for receiving recommendations in response to identification of the user.

Referring to FIG. 23, a simple process for receiving recommendations in response to identification of the user, is illustrated. For example, at a movie theater or other entertainment venue or a web site, a user can obtain recommendations by entering an identifier (and authentication data as required) at step S491. In step S493, the user uses a control to generate a request for a recommendation, for example one relating to a specific category. In step S495, a server process generates a recommendation and stores preference data in a profile base for use in refining recommendations, cross-selling, etc. In step S497, the terminal displays the resulting recommendations, receives further input, etc. Note, the above process may relate to restaurants, entertainment, or any kind of article or service for which many choices are available.

Figure 24:
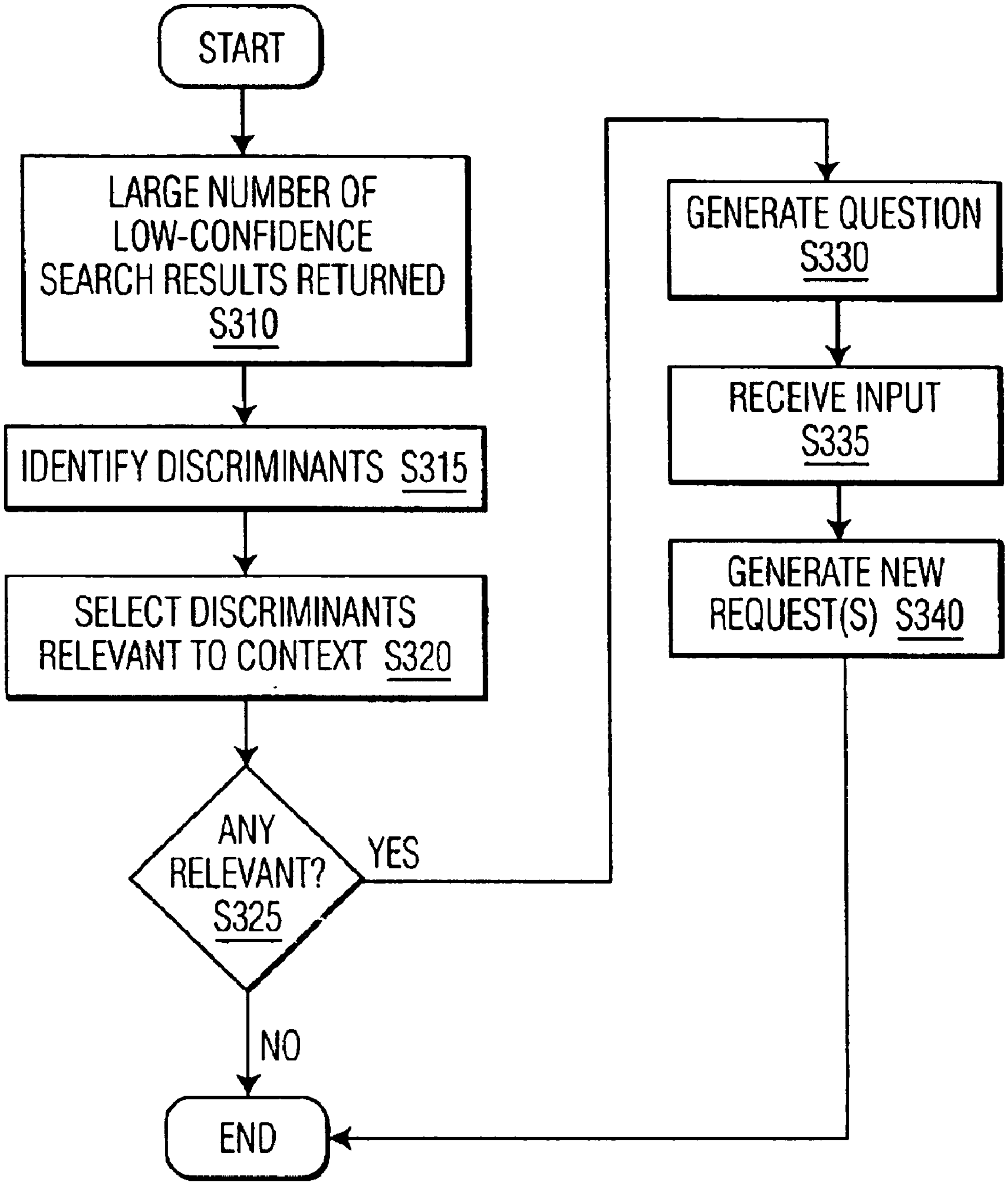
FIG. 24 is a flow chart indicating a procedure for disambiguating a search result with input from the user and automatic identification of the most significant discriminants in the search result according to an embodiment of the invention.

Referring to FIG. 24, a procedure for refining search results that identifies discriminants in the search results, if the number retrieved is very large, is illustrated. The search engine process may look for discriminants in the set of records returned and, instead of simply listing the results returned, offer the user a list of discriminants from which to select. The discriminant may be, for example, an important term that appears in a small percentage of the retrieved results, but is conspicuously absent from the others. It may identify a number of such discriminants and offer all of them to the user to select from.

The identification of discriminants is a well-developed technology in itself. A very simple approach is to generate a histogram that indicates the terms that appear most often in the returned records and to allow the user to select from among the terms with the highest frequency. Another is to look for common incidences of words not specified in the query but which appear in association with words that were specified in the query under the assumption that the former modify the latter when they appear in mutual proximity. These former terms would be presented as options from which to select. The generation of the statistics needed to identify these discriminants is straightforward from the processes employed by search engines. Search engines generate or use index files that permit the ready generation of such statistics.

The discrimnants can be derived by various means. For example, using the returned selection set, a histogram indicating the frequency of each term in the returned set of records can be generated. Those terms with the highest hit counts may be displayed and the user permitted to select one or more. Suppose for example that the query contains the Boolean: "dog" and "fur or hair" and "curly or wavy" and the goal is to find information about a particular breed. In the example, the records returned by the search include information about various breeds, most of them focussing on particular breeds. The terms with the highest frequency of hits may provide some information that can be used, if indicated by the user, to tell the search engine that certain classes of records are not desired and certain classes are desired. So, for example, common descriptors may be returned such as "small," "large," "thin," and "heavy." The user can select from among these to help reduce the selected records to a number that can be conveniently browsed or produce a desired hit. To augment this process, the UI may display the number of hits in the original set, the number that would result from the combination of any of the proposed discriminants with the original query, and the effect of combinations as a new query is generated using the discriminant terms. For an example of the latter, suppose the query contains "thin and small." The display could show the effect as each term is added. This is similar to the way Folio Bound Views® by Folio Corporation works where, as a search query is entered, the number of returned results is continuously updated.

A problem with such a simple discriminant is that such terms may simply tag along with the terms in the original search query. In other words, they may be common to most of the returned results and therefore act as poor discriminants among results. What is more desirable are discriminants that have a high probability of dividing the returned records by a large proportion. One way to identify better discriminants is to look for common instances of words that are not included in the original query but which appear in association with those in the original query inferring that there is meaning in the association. The association may be inferred by mutual proximity of the terms, for example, or grammatical parsing (e.g., identifying adjectives that modify the search query term), etc. Those candidate discriminants that appear with the highest frequency could then be presented to the user and the user permitted to select from among them.

A refinement to the two previous approaches is to select discriminants based on the ability of each to divide the returned set into a small number of subsets. One way to do this is to take a high hit count set of candidate discriminants, such as derived by the histogram procedure, and determine which from among them are "important" terms (importance being inferred, for example, from frequency of occurrence in the record, use in a title, etc.) that appear in a small percentage of the retrieved results, but are conspicuously absent from the others. That is, in some records, the term is important, but the term does not appear in all the records. In the above example of the curly haired dog breed, the name of the breed to which the record relates would be important in records that related to the breed and absent from records unrelated to that breed. The search engine could then show a list of such discriminants, many of which might include breed names.

The procedure of FIG. 24 begins with a large number of low-confidence results being returned by a search process in step S310. In step S315, discriminants are identified in the search results and selected for relevance to the user's state in step S320. If there are any discriminants that are identified as relevant S325, a question is presented to the user in step S330, input is received in step S335 and a new query generated in step S340. If no relevant discriminants are found, the attempt may be aborted, or a more user interaction-intensive process based on arbitrary discriminants followed. Relevance of discriminants may be determined by consulting the user preference base. Since queries may not contain much information from the preference profile, the candidate discriminants may be used as a probe of the profile database to identify profile content that may be relevant to the search. Lexical dictionaries may be used in this context to expand terms in the profile.

Figure 25:
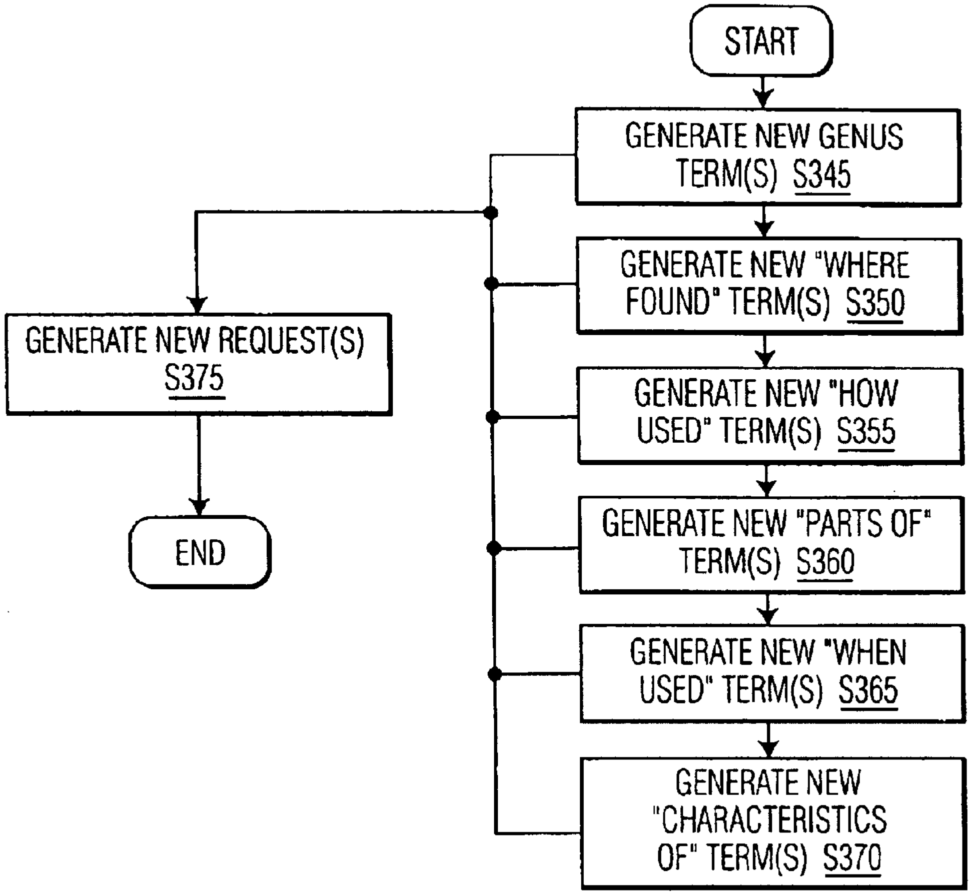
FIG. 25 is a flow chart illustrating a process for expanding search terms according to an embodiment of the invention.
Figure 26:
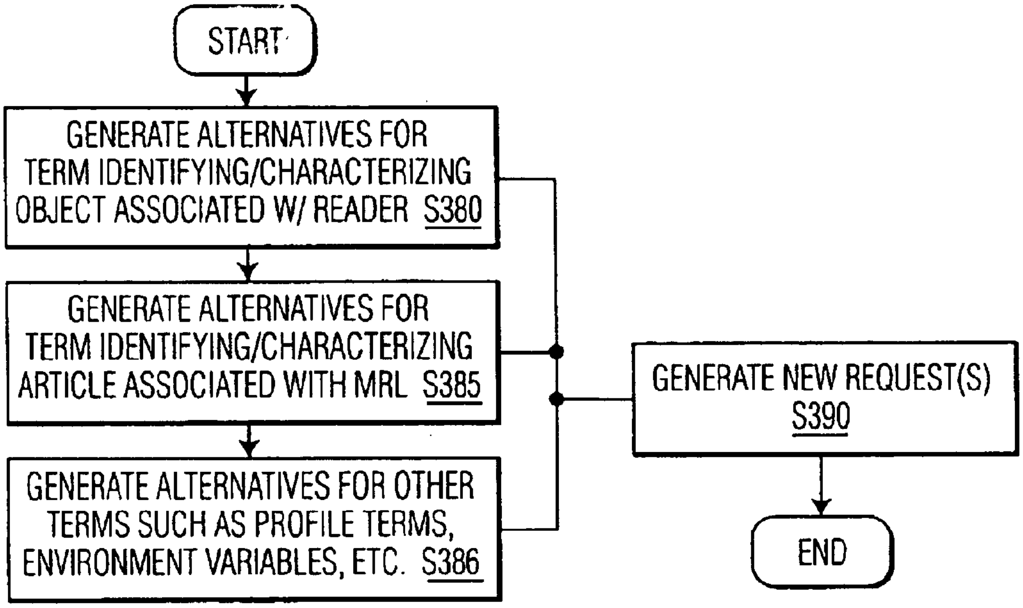
FIG. 26 is a flow chart illustrating a process for expanding queries according to an embodiment of the invention.

Referring to FIG. 25, a procedure for using a dictionary to expand query terms is shown. In step S345, one or more terms that is the genus of a search term or terms is generated and applied in generating a new query or queries at step S375. In step S350, at the same time, one or more new "where found" terms are generated and applied in generating a new query or queries at step S375. In step S355, at the same time, one or more new "how used" terms are generated and applied in generating a new query or queries at step S375. In step S360, at the same time, one or more new "parts of" terms are generated and applied in generating a new query or queries at step S375. In step S365, at the same time, one or more new "when used" terms are generated and applied in generating a new query or queries at step S375. In step S370, at the same time, one or more new "characteristics of" terms are generated and applied in generating a new query or queries at step S375. These related terms are only examples for purposes of illustration. Note that the generation steps S345—S370 may be recursive so that, for example, genera of hypernyms or holonyms of "characteristic of" terms may be generated as well. The procedure of FIG. 25 may be applied to terms characterizing the reader, the article associated with the MRL device, or other terms as illustrated by the procedure of FIG. 26. In step S380 alternative terms are generated for the type of reader. In step S385, alternative terms are generated for the type of article or event identified by the MRL device. In step S386, other terms may be expanded in the same way. All expansions may be used in step S390 to generate alternate requests.

Figure 27:
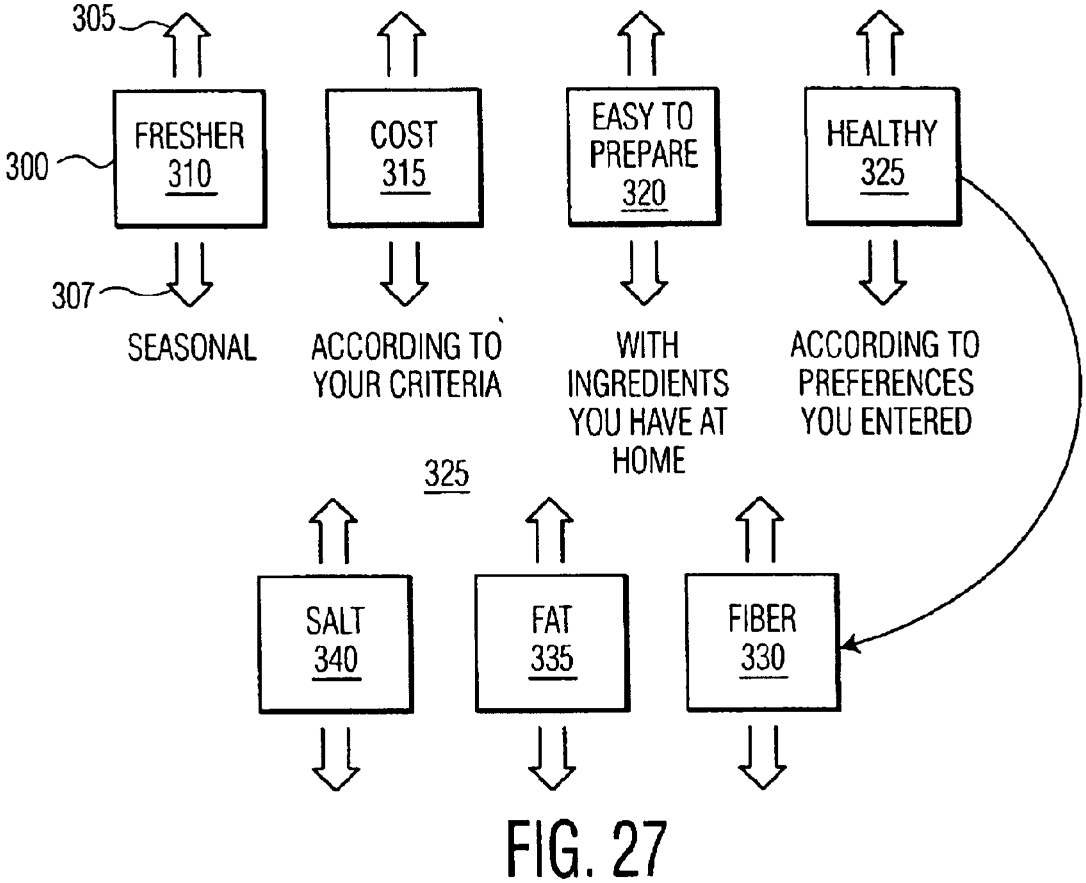
FIG. 27 is a UI for requesting information about items related to an item scanned according to an embodiment of the invention.

Referring to FIG. 27, a UI that may be used to enter particular kinds of scan requests includes controls for displaying various scales along which an article, event, or other thing can be characterized. For example, groceries can be characterized on a scale of freshness, in which dehydrated goods would be low and fresh produce in season would be highest, with frozen foods somewhere in the middle. A spinner type of control with up and down spin buttons 305 and 307 may be used to indicate the type of change from an example item scanned. Thus, a user would scan an item's MRL device, and then indicate his/her interest in something that is like it, but fresher (or cheaper, or easier to prepare, or healthier). A mode control 300 may be used to rotate among various scales such as freshness 310, cost 315, ease of preparation 320, and healthiness 325. The reader or service to which it is connected may choose the scales based on the type of product or event MRL device scanned. For example, the MRL device of a movie might provide a set of scales that included scary, action, light-hearted, etc., while a grocery product might produce scales such as illustrated in FIG. 27. The scales may have multiple layers, for example a layer 325 below the healthiness scale permits the user to change more detailed characteristics, for example, salt content 340, fat content 335, and fiber content 330. Note that the lower level scales could be changed as part of a profile generation so that the user would create a personal definition of what constitutes healthiness, for example.

Figure 28:
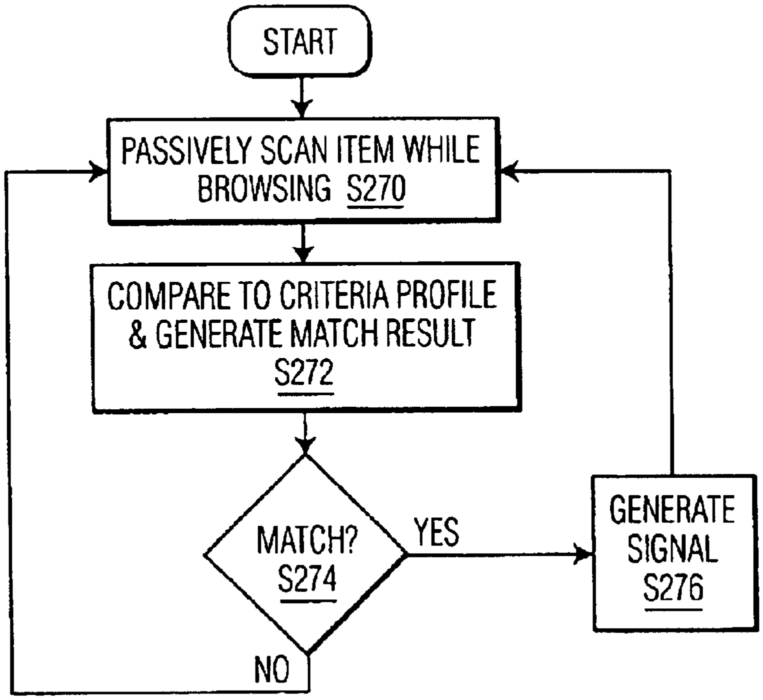
FIG. 28 is a flow chart indicating a procedure for passively scanning items which alerts a user only if specified criteria are met according to an embodiment of the invention.

FIG. 28 shows a procedure for generating outputs resulting from scans only when predefined criteria are met. The user may turn this feature on or off. If a user scans an item and it does not correlate with the criteria in some predefined way, then a null display or no display is generated. The idea here is that a user's portable reader can act as an agent, bothering the user only when the user gets close to an item the user would find interesting. The configuration may require an ability to scan items from a substantial distance so the user need not do anything to obtain a response. MRL devices may be carried or worn by individuals and the present system used to indicate to the user some relevant information about the individuals present, if they meet certain criteria. Beginning at step S270, the reader passively scans MRL devices in its vicinity. It compares each in turn to a criteria profile at step S272. If there is a match at step S274, a signal is generated in step S276 to indicate that result to the user. The signal may include a display or audio output indicating details of what triggered the match. If no match is identified, MRL devices are scanned again in step S270. An example scenario is as follows. A shopper is a gardening lover as indicated clearly by her/his profile. As the shopper passes a set of refrigerators in an appliance store, her/his reader signals the shopper with information about a refrigerator s/he just passed. The information includes a description of a feature of the refrigerator that allows seedlings to be incubated on top of the refrigerator, taking advantage of the gentle heat from the refrigerator's condenser.

Figure 29:
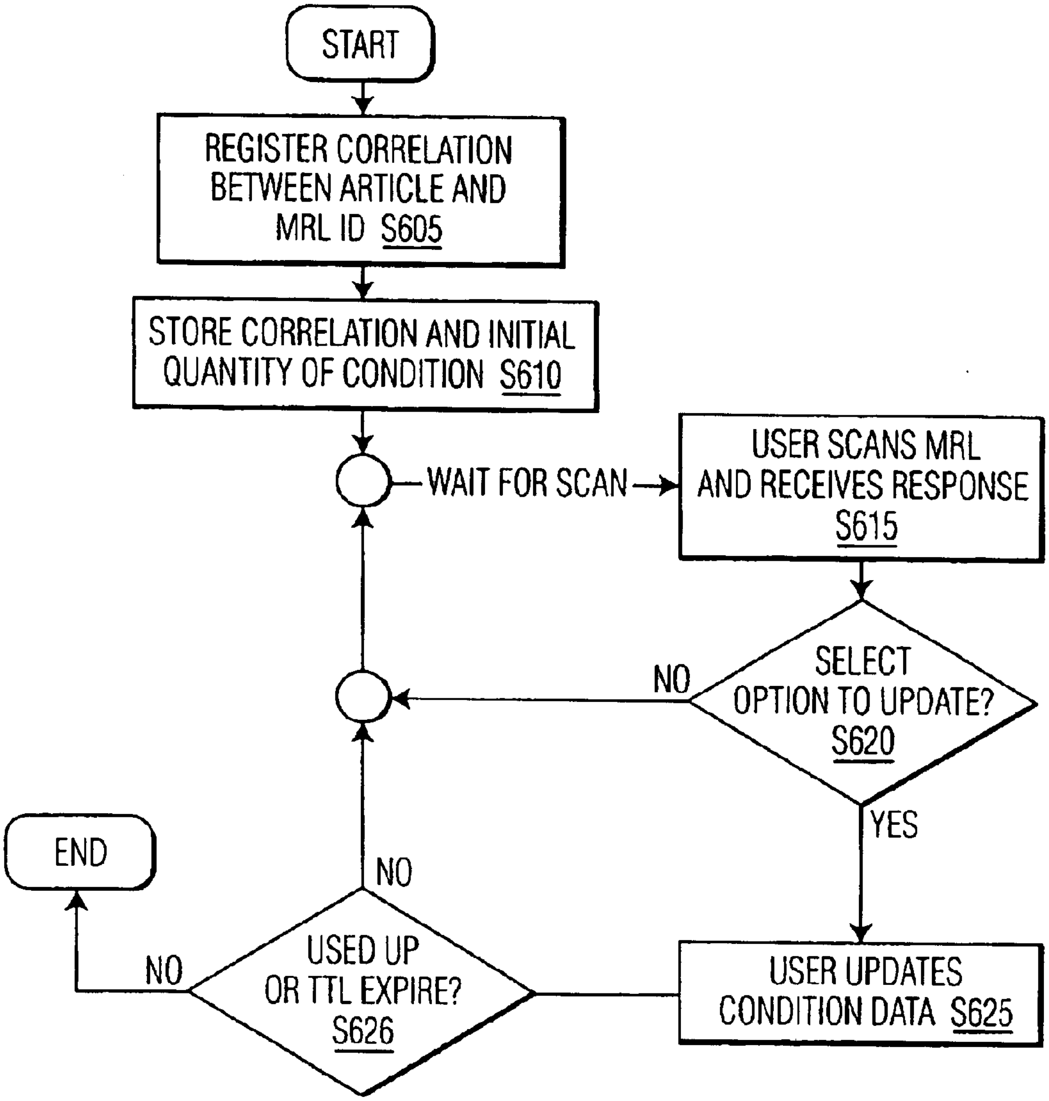
FIG. 29 is a flow chart for a procedure for managing consumables with MRL devices attached thereto according to an embodiment of the invention.

Referring to FIG. 29, as discussed above, it is preferable that there be as few exceptions to types of articles for which the MRL system may be used. For example, it would be a disincentive to adopt an automated system for food inventory maintenance if some things in the food inventory could not be updated automatically. Consumables could be a problem in this regard since MRL devices may not be programmable at the time and location of the preparation of a consumable, for example a tub of potato salad. Beginning with a registration step at S605, a preprogrammed MRL device having a unique identifier and information identifying and characterizing the consumable item, including an initial quantity, are stored in step S610. Then when a scan event occurs S615, the user receives a response or responses in any of the fashions described above, as appropriate. The user is given the option of updating quantity in step S620. If the user elects to do so, the user updates the quantity data in step S625 which is then stored in the correlation resource or database. If the consumable item is used up or some time to live parameter expires (e.g., potato salad has been stored long enough as to become unusable) S626, the thread is deleted and the data (correlation) thrown out. Note that the above procedure may be applied to items whose conditions change over time rather than items that are consumed. For example, a tomato plant may change over time increasing a food inventory. Also, the items may be non-food items such as lumber (e.g., board feet remaining) or pounds of nails. Also, MRL devices may be attached using any suitable means, for example MRL devices may be created with adhesive backing or with reusable ties attached to them. MRL devices may also be molded into containers or permanently affixed to them. A display stand may hold MRL devices near produce items or they may be formed into the plastic bags that are often made available in supermarket produce areas. The data identifying the consumable can be stored by a checkout register in a store as an additional output of a vendor's inventory and/or purchase tracking. Alternatively, there may be stations that permit the user to enter the relevant information as in many European supermarkets where users weigh produce and make a selection at a terminal to print a bar code. The correlation data could be generated in the same way.

Figure 30:
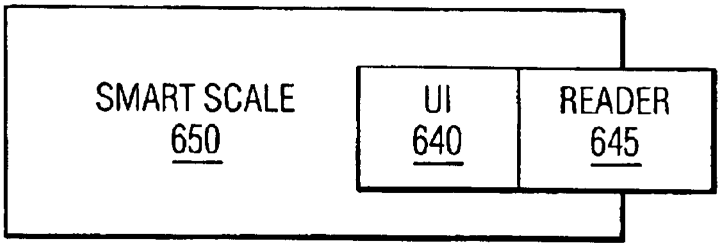
FIG. 30 is an illustration of a smart scale with a MRL reader and UI which is used to update the quantity of a consumable item by correlating remaining quantity in a database with a MRL associated with it according to an embodiment of the invention.

Referring to FIG. 30, quantity can be updated automatically using a device that measures removed or remaining quantity, or some other property of an article that has changed. For example, a smart scale 650 with a reader 645 built into it could be used. The article's last tare weight would be updated to indicate quantity whenever the article was placed on the scale 645 momentarily. Such a scale 645 may be built into a refrigerator and/or cupboard. The scale may have a UI 640. The update data may be entered manually by the user, for example, the UI of a reader built into a table saw could prompt for the change in size of a board or the amount being cut off.

As discussed above, it does not matter where the correlation or other data is stored physically. Networks and Internet may connect one data object to a process just as a data bus connects physical memory or non volatile storage to a processor. Thus, in this discussion and elsewhere, where no particular mention is made of where data is stored, it is assumed not to matter and that a person of ordinary skill could easily make a suitable decision about where to store data—on a vendor's server, on a reader, at a home network server, on a third party server, etc. Thus, profile data may "follow" a user wherever the user goes. So if a user uses a reader in a public place, the user's personal profile is accessible to the processes the user employs. This assumes appropriate security devices are in place to protect the user's profile data. Also note that it has been assumed in the discussions above, in most cases, that some sort of UI, such as those built into a handheld organizer with a touch screen, is associated with the readers discussed to allow data to be displayed and entered. The UI could be part of the device to which the reader is attached or with which it is associated or it could be part of the reader. The details of the UI are not important, except as otherwise noted, and could be of any suitable type at the discretion of a designer.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for tracking descriptive information about a changeable article:

a machine-readable label (MRL) attachable to articles;

one or more processors connectable to a MRL reader and programmed to create an association between data stored in an MRL and descriptive data and store said association in a data store;

said descriptive data including a changeable characteristic of a given article and selectively also profile data characterizing a user and/or user preferences;

said one or more processors being programmed to scan said MRL and permit a user to complete a transaction involving said given article including reading said descriptive data in said data store, said transaction being responsive to said descriptive data.

2. A system as in claim 1, wherein said one or more processors are programmed to accept update data indicating a change in said given article and to update said data describing said given article such that when said one or more processors scan said MRL and permit said user to complete a further transaction involving said given article, said transaction is responsive to change in said given article.

3. A system as in claim 2, wherein said change is a change of quantity of a material of said article.

4. A system as in claim 1, wherein said descriptive data includes a quantity of material of said article.

5. A system as in claim 1, wherein said one or more processors are connectable to be controlled at a terminal such that a maker of said article can at least partially create said descriptive data by inputting data into said terminal.

6. A system as in claim 1, further comprising a scale including a MRL reader, wherein said one or more processors are programmed to accept update data from said scale, said update data including a change in weight of said given article.

7. A system as in claim 1, further comprising a device for measuring a change in said given article, said device including a MRL reader, wherein said one or more processors are programmed to accept update data from said device, said update data including a change in said given article measured by said device.

8. A method for tracking descriptive information about a changeable article, comprising the steps of:

attaching a machine-readable label (MRL) to an article;

said MRL having a unique code;

storing a correlation between descriptive information about said article and said unique code in a data store; and reading said unique code to obtain at least a portion of said descriptive information using said correlation in said data store;

deleting said correlation after the passage of a predetermined period of time after said step of storing.

9. A method as in claim 8, wherein said descriptive information includes an initial quantity or size of said article.

10. A method as in claim 8, further comprising the step of reading said unique code, looking up said correlation responsively to said unique code, and modifying at least a portion of said descriptive information responsively to said correlation in said data store.

11. A method as in claim 10, wherein said descriptive information includes an initial quantity or size of said article.

* * * * *